United States Patent
Garg et al.

(10) Patent No.: US 10,551,902 B2
(45) Date of Patent: Feb. 4, 2020

(54) METHODS AND APPARATUS FOR PROVIDING ACCESS TO PERIPHERAL SUB-SYSTEM REGISTERS

(71) Applicant: Apple Inc., Cupertino, CA (US)

(72) Inventors: Saurabh Garg, Cupertino, CA (US); Karan Sanghi, Cupertino, CA (US); Vladislav Petkov, Cupertino, CA (US); Richard Solotke, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 222 days.

(21) Appl. No.: 15/647,088

(22) Filed: Jul. 11, 2017

(65) Prior Publication Data

US 2018/0129261 A1 May 10, 2018

Related U.S. Application Data

(60) Provisional application No. 62/420,143, filed on Nov. 10, 2016.

(51) Int. Cl.
*G06F 1/00* (2006.01)
*G06F 1/3234* (2019.01)
(Continued)

(52) U.S. Cl.
CPC ............ *G06F 1/325* (2013.01); *G06F 1/3253* (2013.01); *G06F 1/3287* (2013.01);
(Continued)

(58) Field of Classification Search
CPC .... G06F 1/325; G06F 1/3203; G06F 13/4278; G06F 13/4273; G06F 13/404;
(Continued)

(56) References Cited

U.S. PATENT DOCUMENTS

| 4,805,137 A | 2/1989 | Grant et al. |
| 4,949,299 A | 8/1990 | Pickett |

(Continued)

FOREIGN PATENT DOCUMENTS

| EP | 3013008 A1 | 4/2016 |
| JP | 2004086792 A | 3/2004 |

(Continued)

OTHER PUBLICATIONS

Bluetooth Core Specification v.5.0, Dec. 6, 2016.
(Continued)

*Primary Examiner* — Xuxing Chen
(74) *Attorney, Agent, or Firm* — Gazdzinski & Associates, PC

(57) ABSTRACT

Methods and apparatus for isolation of sub-system resources (such as clocks, power, and reset) within independent domains. In one embodiment, each sub-system of a system has one or more dedicated power and clock domains that operate independent of other sub-system operation. For example, in an exemplary mobile device with cellular, WLAN and PAN connectivity, each such sub-system is connected to a common memory mapped bus function, yet can operate independently. The disclosed architecture advantageously both satisfies the power consumption limitations of mobile devices, and concurrently provides the benefits of memory mapped connectivity for high bandwidth applications on such mobile devices.

20 Claims, 10 Drawing Sheets

(51) Int. Cl.
  *G06F 1/3287* (2019.01)
  *G06F 9/30* (2018.01)
  *G06F 9/4401* (2018.01)
  *G06F 13/42* (2006.01)

(52) U.S. Cl.
  CPC .......... *G06F 9/3004* (2013.01); *G06F 9/4411* (2013.01); *G06F 9/4418* (2013.01); *G06F 13/4221* (2013.01)

(58) Field of Classification Search
  CPC .. G06F 13/4221; G06F 9/4418; G06F 9/4411; G06F 1/3253; G06F 9/3004; G06F 1/3287; G06F 1/24; Y02D 10/44; Y02D 10/151; Y02D 10/14
  See application file for complete search history.

(56) References Cited

U.S. PATENT DOCUMENTS

| | | | |
|---|---|---|---|
| 4,987,529 | A | 1/1991 | Craft et al. |
| 5,367,688 | A | 11/1994 | Croll |
| 5,467,459 | A | 11/1995 | Alexander et al. |
| 5,485,578 | A | 1/1996 | Sweazey |
| 5,613,086 | A | 3/1997 | Frey et al. |
| 5,659,542 | A | 8/1997 | Bell et al. |
| 5,708,779 | A | 1/1998 | Graziano et al. |
| 5,731,973 | A | 3/1998 | Takaishi et al. |
| 5,850,395 | A | 12/1998 | Hauser et al. |
| 5,903,564 | A | 5/1999 | Ganmukhi et al. |
| 5,943,507 | A | 8/1999 | Cornish et al. |
| 6,216,178 | B1 | 4/2001 | Stracovsky et al. |
| 6,233,702 | B1 | 5/2001 | Horst et al. |
| 6,260,152 | B1 | 7/2001 | Cole et al. |
| 6,359,863 | B1 | 3/2002 | Varma et al. |
| 6,411,997 | B1 | 6/2002 | Dawes et al. |
| 6,434,633 | B1 | 8/2002 | Braun et al. |
| 6,523,073 | B1 | 2/2003 | Kammer et al. |
| 6,553,446 | B1 | 4/2003 | Miller |
| 6,693,895 | B1 | 2/2004 | Crummey et al. |
| 6,735,642 | B2 | 5/2004 | Kagan et al. |
| 6,947,442 | B1 | 9/2005 | Sato et al. |
| 6,948,094 | B2 | 9/2005 | Schultz et al. |
| 7,100,020 | B1 | 8/2006 | Brightman et al. |
| 7,127,600 | B2 | 10/2006 | Zimmer et al. |
| 7,191,240 | B1 | 3/2007 | Johnson |
| 7,281,172 | B2 | 10/2007 | Chujo |
| 7,397,774 | B1 | 7/2008 | Holland et al. |
| 7,398,382 | B2 | 7/2008 | Rothman et al. |
| 7,506,084 | B2 | 3/2009 | Moerti et al. |
| 7,509,391 | B1 | 3/2009 | Chauvel et al. |
| 7,587,575 | B2 | 9/2009 | Moertl et al. |
| 7,590,817 | B2 | 9/2009 | Moertl et al. |
| 7,617,377 | B2 | 11/2009 | Moertl et al. |
| 7,681,012 | B2 | 3/2010 | Verm et al. |
| 7,685,476 | B2 | 3/2010 | Andre et al. |
| 7,853,731 | B1 | 12/2010 | Zeng |
| 7,899,941 | B2 | 3/2011 | Hendry et al. |
| 7,908,335 | B1 | 3/2011 | Citterelle et al. |
| 7,941,682 | B2 | 5/2011 | Adams |
| 8,255,725 | B2 | 8/2012 | Shimazaki et al. |
| 8,352,624 | B2 | 1/2013 | Zimmerman et al. |
| 8,422,404 | B2 | 4/2013 | Taki |
| 8,468,285 | B2 | 6/2013 | Kobayashi |
| 8,555,099 | B2 | 10/2013 | Marinkovic et al. |
| 8,635,412 | B1 | 1/2014 | Wilshire |
| 8,656,228 | B2 | 2/2014 | Check et al. |
| 8,769,168 | B2 | 7/2014 | Moertl et al. |
| 8,788,822 | B1 | 7/2014 | Riddle |
| 8,799,537 | B1 | 8/2014 | Zhu et al. |
| 8,808,091 | B2 | 8/2014 | Shaw et al. |
| 8,819,386 | B1 | 8/2014 | Mather |
| 8,832,331 | B2 | 9/2014 | Co |
| 8,848,809 | B2 | 9/2014 | Whitby-Strevens |
| 8,914,649 | B2 | 12/2014 | So et al. |
| 9,152,580 | B1 | 10/2015 | Chau et al. |
| 9,170,957 | B2 | 10/2015 | Touzni et al. |
| 9,280,360 | B2 | 3/2016 | Xu et al. |
| 9,319,090 | B2 | 4/2016 | Whitby-Strevens |
| 9,544,069 | B2 | 1/2017 | Whitby-Strevens et al. |
| 9,547,535 | B1 | 1/2017 | Wilt |
| 9,568,970 | B1 | 2/2017 | Kaushal et al. |
| 9,582,448 | B2 | 2/2017 | Saitou |
| 9,594,718 | B2 | 3/2017 | Kaushik et al. |
| 9,769,756 | B1 | 9/2017 | Cui et al. |
| 9,830,289 | B2 | 11/2017 | Pulyala et al. |
| 9,910,475 | B2 | 3/2018 | Kurts et al. |
| 9,913,305 | B2 | 3/2018 | Pinheiro et al. |
| 9,959,124 | B1 | 5/2018 | Herbeck et al. |
| 2002/0013868 | A1 | 1/2002 | West |
| 2002/0044553 | A1 | 4/2002 | Chakravorty |
| 2002/0065867 | A1 | 5/2002 | Chauvel |
| 2002/0169938 | A1 | 11/2002 | Scott et al. |
| 2003/0014607 | A1 | 1/2003 | Slavin et al. |
| 2003/0086122 | A1 | 5/2003 | Parry |
| 2003/0200413 | A1 | 10/2003 | Gurumoorthy et al. |
| 2004/0044929 | A1 | 3/2004 | Chujo |
| 2004/0064589 | A1 | 4/2004 | Boucher et al. |
| 2004/0128568 | A1 | 7/2004 | O'Shea |
| 2004/0179546 | A1 | 9/2004 | McDaniel et al. |
| 2004/0201749 | A1 | 10/2004 | Malloy |
| 2004/0221056 | A1 | 11/2004 | Kobayashi |
| 2004/0228365 | A1 | 11/2004 | Kobayashi |
| 2005/0076196 | A1 | 4/2005 | Zimmer et al. |
| 2005/0108385 | A1 | 5/2005 | Wechter et al. |
| 2005/0114620 | A1 | 5/2005 | Justen |
| 2005/0117601 | A1 | 6/2005 | Anderson et al. |
| 2005/0149711 | A1 | 7/2005 | Zimmer et al. |
| 2005/0157781 | A1 | 7/2005 | Ho et al. |
| 2005/0285862 | A1 | 12/2005 | Noda et al. |
| 2006/0039285 | A1 | 2/2006 | Chapman et al. |
| 2006/0107071 | A1 | 5/2006 | Girish et al. |
| 2006/0218301 | A1 | 9/2006 | O'Toole et al. |
| 2007/0005869 | A1 | 1/2007 | Balraj et al. |
| 2007/0043901 | A1 | 2/2007 | Wu et al. |
| 2007/0070997 | A1 | 3/2007 | Weitz et al. |
| 2007/0180041 | A1 | 8/2007 | Suzuoki |
| 2007/0201492 | A1 | 8/2007 | Kobayashi |
| 2007/0226417 | A1 | 9/2007 | Davis |
| 2007/0286246 | A1 | 12/2007 | Kobayashi |
| 2008/0010563 | A1 | 1/2008 | Nishimura |
| 2008/0046689 | A1 | 2/2008 | Chen et al. |
| 2008/0077816 | A1 | 3/2008 | Ravichandran |
| 2008/0183931 | A1 | 7/2008 | Verm et al. |
| 2008/0231711 | A1 | 9/2008 | Glen et al. |
| 2008/0235355 | A1 | 9/2008 | Spanier et al. |
| 2008/0244259 | A1 | 10/2008 | Zimmer et al. |
| 2008/0301148 | A1 | 12/2008 | Lee et al. |
| 2009/0024924 | A1 | 1/2009 | Kim |
| 2009/0113141 | A1 | 4/2009 | Bullman et al. |
| 2009/0138650 | A1 | 5/2009 | Lin et al. |
| 2009/0177847 | A1 | 7/2009 | Ceze et al. |
| 2009/0189442 | A1 | 7/2009 | Chi |
| 2009/0282050 | A1 | 11/2009 | Thomas et al. |
| 2009/0282088 | A1 | 11/2009 | Thomas et al. |
| 2010/0017655 | A1 | 1/2010 | Gooding et al. |
| 2010/0030932 | A1 | 2/2010 | Ergas et al. |
| 2010/0082859 | A1 | 4/2010 | Hendry et al. |
| 2010/0098419 | A1 | 4/2010 | Levy et al. |
| 2010/0329319 | A1 | 12/2010 | Dai et al. |
| 2011/0022859 | A1 | 1/2011 | More et al. |
| 2011/0029696 | A1 | 2/2011 | Uehara |
| 2011/0035575 | A1 | 2/2011 | Kwon |
| 2011/0052142 | A1 | 3/2011 | Sultenfuss et al. |
| 2011/0083002 | A1 | 4/2011 | Albers et al. |
| 2011/0219208 | A1 | 9/2011 | Asaad et al. |
| 2011/0242425 | A1 | 10/2011 | Zeng |
| 2011/0248865 | A1* | 10/2011 | Hong .................. G01S 3/7803 340/870.07 |
| 2011/0257983 | A1 | 10/2011 | Rathonyi et al. |
| 2011/0276710 | A1 | 11/2011 | Mighani et al. |
| 2011/0283031 | A1 | 11/2011 | Lee |
| 2011/0310296 | A1 | 12/2011 | Lee et al. |
| 2011/0320861 | A1 | 12/2011 | Bayer et al. |

(56) References Cited

U.S. PATENT DOCUMENTS

| | | |
|---|---|---|
| 2012/0017063 A1 | 1/2012 | Hummel et al. |
| 2012/0084483 A1 | 4/2012 | Sanjive |
| 2012/0084484 A1 | 4/2012 | Post et al. |
| 2012/0102307 A1 | 4/2012 | Wong |
| 2012/0124252 A1 | 5/2012 | Kayama et al. |
| 2012/0159513 A1 | 6/2012 | Pakhunov et al. |
| 2012/0224640 A1 | 9/2012 | Sole et al. |
| 2012/0229076 A1 | 9/2012 | Zhu et al. |
| 2012/0306553 A1 | 12/2012 | Kim et al. |
| 2013/0050216 A1 | 2/2013 | Whitby-Strevens et al. |
| 2013/0057567 A1 | 3/2013 | Frank et al. |
| 2013/0124895 A1 | 5/2013 | Saha et al. |
| 2013/0138840 A1 | 5/2013 | Kegel et al. |
| 2013/0162911 A1 | 6/2013 | Glen |
| 2013/0290947 A1 | 10/2013 | Li |
| 2014/0033220 A1 | 1/2014 | Campbell et al. |
| 2014/0122828 A1 | 5/2014 | Kagan et al. |
| 2014/0173236 A1 | 6/2014 | Kegel |
| 2014/0189057 A1 | 7/2014 | Sankoda et al. |
| 2014/0215236 A1 | 7/2014 | Heinrich et al. |
| 2014/0244866 A1 | 8/2014 | Manula et al. |
| 2014/0247983 A1 | 9/2014 | MacInnis et al. |
| 2015/0036051 A1 | 2/2015 | Broberg et al. |
| 2015/0189109 A1 | 7/2015 | Whitby-Strevens et al. |
| 2015/0205749 A1 | 7/2015 | Whitby-Strevens et al. |
| 2015/0212806 A1 | 7/2015 | Hsieh |
| 2015/0293873 A1* | 10/2015 | Shao ............... G06F 13/4221 710/314 |
| 2015/0309650 A1 | 10/2015 | Ahmed et al. |
| 2015/0309940 A1 | 10/2015 | Kumar et al. |
| 2015/0378737 A1 | 12/2015 | Debbage et al. |
| 2016/0034195 A1 | 2/2016 | Li et al. |
| 2016/0041852 A1 | 2/2016 | Suarez et al. |
| 2016/0077989 A1 | 3/2016 | Pulyala et al. |
| 2016/0091959 A1 | 3/2016 | Barak et al. |
| 2016/0103480 A1 | 4/2016 | Sanghi et al. |
| 2016/0103689 A1 | 4/2016 | Sanghi et al. |
| 2016/0103743 A1 | 4/2016 | Sanghi et al. |
| 2016/0179157 A1 | 6/2016 | Ardanaz et al. |
| 2016/0224442 A1 | 8/2016 | Sanghi et al. |
| 2016/0269991 A1 | 9/2016 | Van et al. |
| 2016/0299860 A1 | 10/2016 | Harriman |
| 2016/0364350 A1 | 12/2016 | Sanghi et al. |
| 2017/0108912 A1 | 4/2017 | Li et al. |
| 2017/0177222 A1 | 6/2017 | Singh et al. |
| 2017/0228481 A1 | 8/2017 | Pusuluri et al. |
| 2017/0249098 A1 | 8/2017 | Petkov et al. |
| 2017/0269675 A1* | 9/2017 | Klacar ............... G06F 1/3215 |
| 2017/0286300 A1 | 10/2017 | Doshi et al. |
| 2017/0286322 A1 | 10/2017 | Garg et al. |
| 2017/0286323 A1 | 10/2017 | Garg et al. |
| 2018/0074572 A1 | 3/2018 | Bauman et al. |
| 2018/0101498 A1* | 4/2018 | Cosby ............... G06F 13/4068 |
| 2018/0129269 A1 | 5/2018 | Garg et al. |
| 2018/0129270 A1 | 5/2018 | Garg et al. |
| 2018/0160155 A1 | 6/2018 | Iguchi et al. |
| 2018/0162770 A1 | 6/2018 | Hawtof et al. |
| 2018/0225251 A1 | 8/2018 | Sthoeger et al. |
| 2018/0367460 A1 | 12/2018 | Gao et al. |
| 2019/0073011 A1 | 3/2019 | Paterson et al. |

FOREIGN PATENT DOCUMENTS

| | | |
|---|---|---|
| JP | 2012108677 A | 6/2012 |
| JP | 2013246642 A | 12/2013 |
| JP | 2015001867 A | 1/2015 |
| WO | WO-2008070138 A2 | 6/2008 |

OTHER PUBLICATIONS

PCI Express Base Specification Revision 4.0, Oct. 5, 2017.

Jackson, Budruk: "PCI Express Technology", Sep. 2012 (Sep. 2012), MindShare Press, XP002777351, pp. 49,86,87,712-723.

ECN L1 PM Substates with CLKREQ approved Aug. 23, 2012.

PCI Express base Specification Revision 3.0, published Nov. 10, 2010.

PCI Express Base Specification Revision 3.1, published Oct. 8, 2014.

Universal Serial Bus, Communication Class, Subclass Specifications for Network Control Model (NCM) Devices; Revision 1.0 (Errata 1), Nov. 24, 2010, published by USB Implementers Forum, Inc.

* cited by examiner

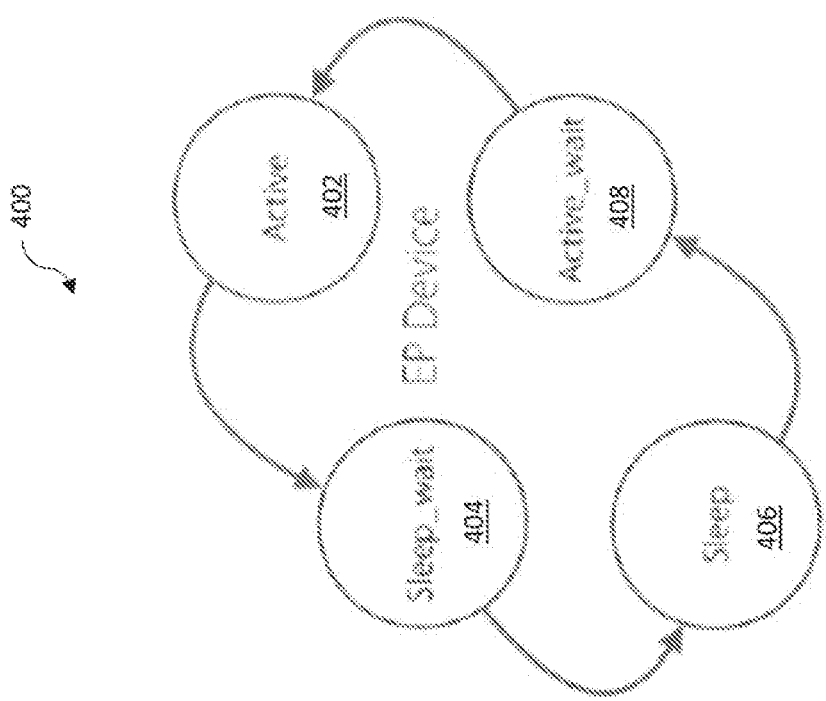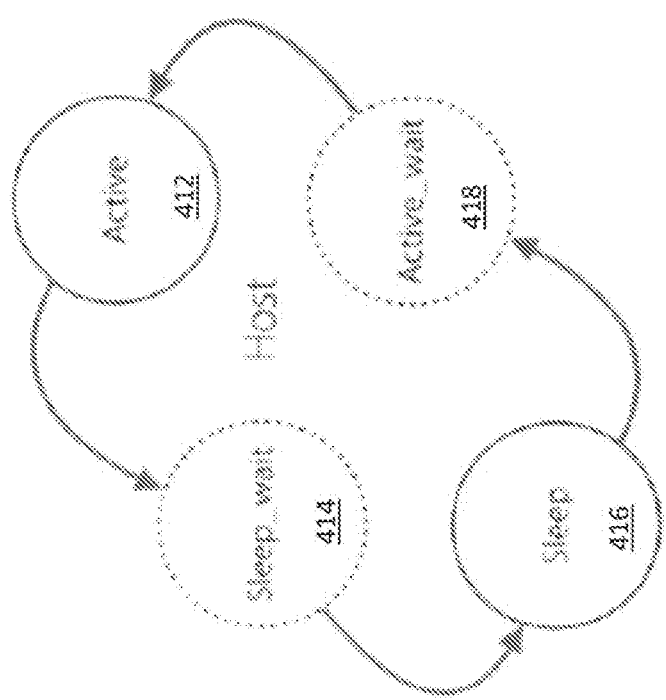
FIG. 4

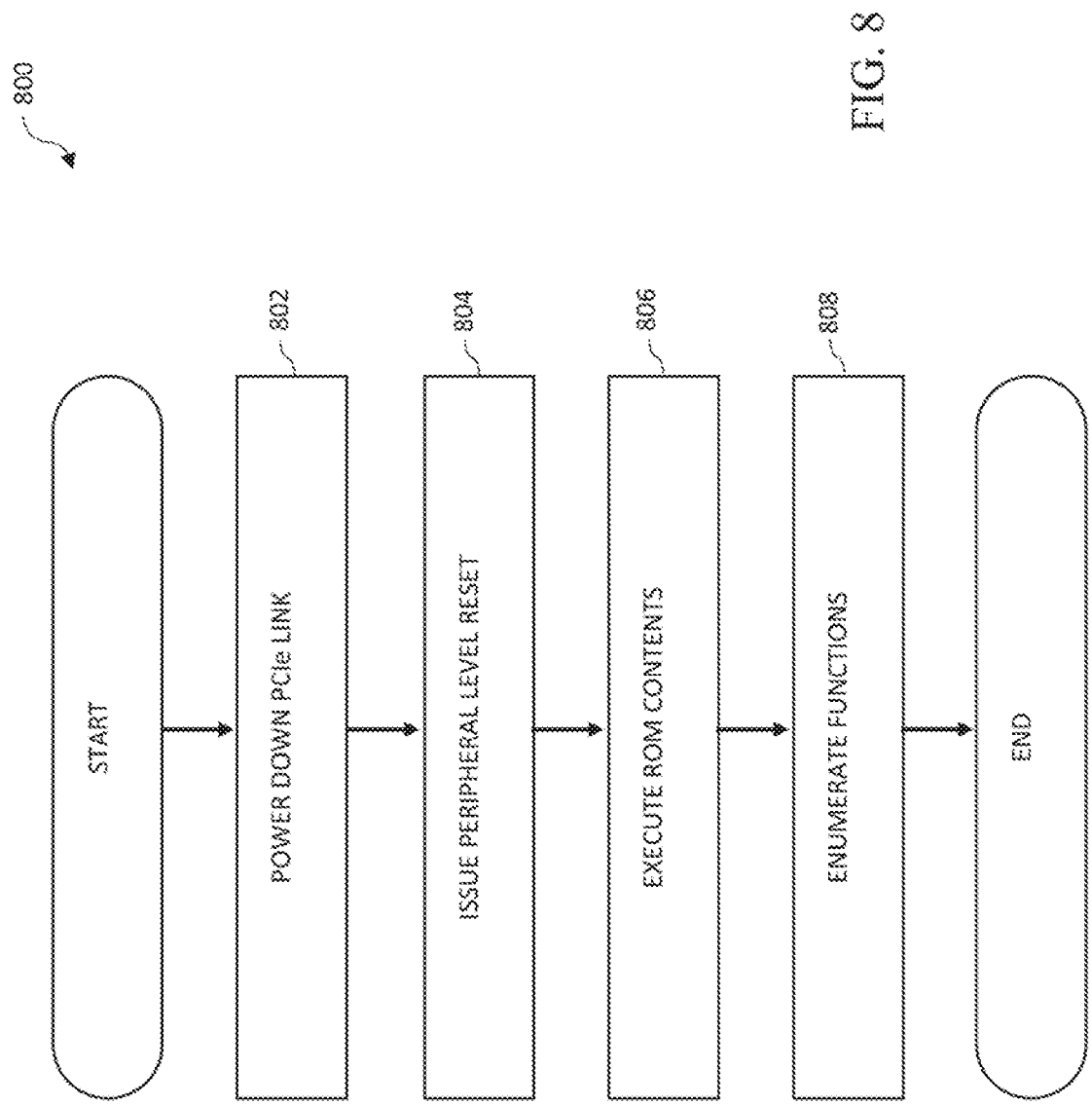

METHODS AND APPARATUS FOR PROVIDING ACCESS TO PERIPHERAL SUB-SYSTEM REGISTERS

PRIORITY

This application claims the benefit of priority to commonly owned and U.S. Provisional Patent Application Ser. No. 62/420,143 entitled "Apparatus and Methods for Independent Power and Clock Domains of a Memory mapped Architecture", filed Nov. 10, 2016, the contents of which are incorporated herein by reference in its entirety.

RELATED APPLICATIONS

This application is related to commonly owned and co-pending U.S. patent application Ser. No. 15/647,063 entitled "Methods and Apparatus for Providing Individualized Power Control for Peripheral Sub-Systems" filed concurrently herewith; and commonly owned and co-pending U.S. patent application Ser. No. 15/647,103 entitled "Methods and Apparatus for Providing Peripheral Sub-System Stability" filed concurrently herewith, each of the foregoing incorporated herein by reference in its entirety.

This application is also related to commonly owned and co-pending U.S. patent application Ser. No. 14/879,024 entitled "Methods and Apparatus for Running and Booting an Inter-Processor Communication Link Between Independently Operable Processors", filed Oct. 8, 2015 and issued as U.S. Pat. No. 10,078,361 on Sep. 18, 2018, Ser. No. 14/879,027 entitled "Methods and Apparatus for Managing Power with an Inter-Processor Communication Link Between Independently Operable Processors", filed Oct. 8, 2015 and issued as U.S. Pat. No. 9,971,397 on May 15, 2018, and Ser. No. 14/879,030 entitled "Methods and Apparatus for Recovering Errors with an Inter-Processor Communication Link Between Independently Operable Processors", filed Oct. 8, 2015 and issued as U.S. Pat. No. 9,798,377 on Oct. 24, 2017, each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

The disclosure relates generally to the field of electronics devices, as well as bus architectures thereof. More particularly, in one exemplary aspect, the disclosure is directed to methods and apparatus for independent operation of power, clock, and/or other resource domains for a memory mapped architecture.

DESCRIPTION OF RELATED TECHNOLOGY

Peripheral Component Interconnect Express (PCIe), is a high-speed serial computer expansion bus technology that has very high adoption rates by computer and consumer electronics manufacturers. One reason for this success is that PCIe enables direct access to a shared memory map for input/output (I/O) between devices and functions. Memory mapped access greatly reduces transactional overhead by reducing e.g., bus arbitration, and centralized memory management. In fact, PCIe has become the de facto standard for adding additional input/output (I/O) capability beyond the capabilities offered by a computer system base chipsets. In addition to the direct memory mapped bus capabilities that are natively supported by PCIe, the broad ecosystem and ongoing development of hardware and/or software drivers provide significant opportunities to leverage time-tested and robust commodity components.

As a brief aside, PCIe was based on the older PCI expansion bus technology developed in 1993. At that time, the goal of PCI was to provide a standard method of adding hardware units to a computer bus. Each hardware unit was connected to a shared parallel bus, using a mechanism to identify each hardware unit as a unique device of the shared bus. Each device was further logically subdivided into up to eight (8) functions. Thus, originally the PCI bus could support several devices, each with several functions. With the advent of PCIe, the physically shared parallel bus was replaced with a peer-to-peer high-speed serial bus. By removing the shared parallel bus, PCIe enabled support for full-duplex communication between any two (2) endpoints, with no inherent limitation on concurrent access across multiple endpoints.

While PCIe is well adapted to personal computing applications, it was not designed for mobile space considerations e.g., power consumption, transactional efficiency, and/or other mobility considerations. For example, personal computers are typically plugged into "wall power" so power consumption or conservation is typically not an issue. In contrast, mobile devices operate on battery power and must curtail excessive power consumption to maximize battery life.

Similarly, personal computers generally support a single processor topology that may infrequently access external networks (such as the broader Internet) on an as-needed basis. In contrast, mobile devices may have an application processor for servicing user tasks, but may also have multiple additional modem processors that autonomously search for, register to, and/or transact data with, network management entities such as those of wireless LANs or cellular networks.

While PCIe's limitations have historically limited its applicability to the mobile space, the ever increasing bandwidth capabilities of wireless technology and changes in consumer taste for larger mobile devices have led manufacturers to reconsider PCIe as a feasible bus solution. In particular, PCIe memory mapped bus capabilities have become increasingly popular. To these ends, improved methods and apparatus are needed to further optimize high-speed direct memory mapped bus capabilities for mobile applications.

SUMMARY

The present disclosure satisfies the foregoing needs by providing, inter alia, systems, methods, and apparatus for independent operation of power, clock, and/or other resource domains within a memory mapped bus architecture.

In a first aspect, a method for providing individualized power control for a plurality of sub-systems within an electronic device is disclosed. In one embodiment, the method includes establishing a memory mapped interface to the plurality of sub-systems via an endpoint, each of the plurality of sub-systems being characterized by a corresponding power management state machine; and for one of the plurality of sub-systems, causing the corresponding power management state machine to transition to an active state from a sleep state independent from other ones of the plurality of sub-systems.

In one variant, the transition of the one of the plurality of sub-systems from the active state from the sleep state may occur without transitioning other ones of the plurality of sub-systems to an active state from a sleep state.

In another variant, the method further includes independently powering on/off each of the plurality of sub-systems independent of other ones of the plurality of sub-systems.

In yet another variant, the electronic device further comprises a host processor apparatus, the host processor apparatus exerting independent power control over the plurality of sub-systems.

In yet another variant, the exertion of independent power control over the plurality of sub-systems further includes keeping a first sub-system of the plurality of sub-systems awake.

In yet another variant, the exertion of independent power control over the plurality of sub-systems further includes forcing a second sub-system of the plurality of sub-systems to sleep, while keeping the first sub-system of the plurality of sub-systems awake.

In yet another variant, the method further includes isolating a power sequence of the one of the plurality of sub-systems from other ones of the plurality of sub-systems.

In a second aspect, a method for providing access to a plurality of sub-system registers corresponding to a plurality of sub-systems within an endpoint apparatus associated with the plurality of sub-systems is disclosed. In one embodiment, the method includes establishing a memory mapped interface to the endpoint apparatus; and accessing, via the memory mapped interface, at least one of the plurality of sub-system registers, without waking the corresponding at least one sub-system.

In one variant, the accessing, via the memory mapped interface, the at least one of the plurality of sub-system registers, further includes reading a register associated with one of the plurality of sub-system registers.

In another variant, the accessing, via the memory mapped interface, the at least one of the plurality of sub-system registers, further includes writing to a register associated with one of the plurality of sub-system registers.

In yet another variant, the accessing further includes executing an instruction that accesses a memory location within a Peripheral Component Interconnect Express (PCIe) function; waking a PCIe communication link; and accessing a memory space within the memory mapped interface, the memory space associated with the PCIe communication link.

In yet another variant, the method further includes waking the corresponding at least one sub-system subsequent to the accessing of the memory space.

In yet another variant, the corresponding at least one sub-system comprises a cellular sub-system and the method further includes querying for cellular function within the endpoint apparatus without waking the cellular sub-system.

In yet another variant, the method further includes accessing, via the memory mapped interface, each of the plurality of sub-system registers, without waking the plurality of sub-systems.

In a third aspect, a method for providing individualized booting of a plurality of sub-systems of a computerized apparatus is disclosed. In one embodiment, the method includes establishing a memory mapped interface to an endpoint associated with the apparatus, the endpoint being operatively coupled to each of the plurality of sub-systems; enumerating the plurality of sub-systems; and sequentially booting at least two of the enumerated plurality of sub-systems.

In one variant, the method further includes pruning one of the enumerated plurality of sub-systems from the booting process.

In another variant, the pruned one of the enumerated plurality of sub-systems includes a personal area network (PAN) sub-system and the method further includes disabling PAN sub-system capability prior to the pruning.

In yet another variant, the method further includes powering the endpoint regardless of operational status for any of the plurality of sub-systems, the powering of the endpoint enabling the enumerating.

In yet another variant, the method further includes initializing a configuration space for one of the plurality of sub-systems.

In yet another variant, the method further includes accessing the configuration space for the one of the plurality of sub-systems, the accessing occurring regardless of the power state of the one of the plurality of sub-systems.

In yet another variant, the method further includes determining an order of importance for the at least two of the enumerated plurality of sub-systems and the sequentially booting the at least two of the enumerated plurality of sub-systems occurs in accordance with the determined order of importance.

In a fourth aspect, a method for providing individualized reset and recovery of a sub-system is disclosed. In one embodiment, the method includes establishing a memory mapped interface to an endpoint, the memory mapped interface including a plurality of memory regions corresponding to a plurality of sub-systems; responsive to detecting an error within a first sub-system of the plurality of sub-systems, writing to a reset address within a corresponding first memory region; booting the first sub-system in response to the writing; and recovering diagnostic information corresponding to the detected error.

In one variant, the method further includes executing a looping instruction in response to the detecting of the error within the first sub-system, the looping instruction enabling the recovering of the diagnostic information.

In another variant, the method further includes collecting a snapshot of a memory region of the plurality of memory regions responsive to the detecting of the error.

In yet another variant, the endpoint includes a plurality of functions, each of the functions corresponding to a given one of the plurality of sub-systems and the method further includes issuing a function level reset to a function of the plurality of functions.

In yet another variant, the issuing of the function level reset to the function of the plurality of functions further includes resetting the corresponding sub-system associated with the function of the plurality of functions.

In yet another variant, the booting of the first sub-system occurs without requiring booting of other ones of the plurality of sub-systems.

In a fifth aspect, a computerized apparatus is disclosed. In one embodiment, the computerized apparatus includes a host processing apparatus including a root complex; a peripheral apparatus including an endpoint apparatus, the endpoint apparatus including a plurality of functions, each of the plurality of functions being coupled with a respective sub-system of a plurality of sub-systems; and a communication link between the root complex and the endpoint apparatus.

In one variant, each of the plurality of sub-systems includes separate power management from other ones of the plurality of sub-systems.

In another variant, the host processing apparatus includes a separate host power management from the plurality of sub-systems; and the communication link comprises a separate link power management from the host processing apparatus and the plurality of sub-systems.

In yet another variant, one of the plurality of sub-systems includes a wireless local area network (WLAN) sub-system, where the WLAN sub-system is capable of scanning for nearby beacons without necessitating wake-up of other ones of the plurality of sub-systems.

In yet another variant, the WLAN sub-system is capable of scanning for the nearby beacons without necessitating wake-up of either the communication link or the host processing apparatus.

In yet another variant, one of the plurality of sub-systems includes a cellular sub-system, where the cellular sub-system is configured to connect with a cellular network during a mobile management update without powering on one or more of other ones of the sub-systems, the host processing apparatus, and the communication link.

In a second embodiment, the computerized apparatus includes a host processing apparatus comprising a root complex; a peripheral apparatus including an endpoint apparatus, the endpoint apparatus including a plurality of functions disposed within a memory mapped interface, each of the plurality of functions being coupled with a respective sub-system of a plurality of sub-systems; and a communication link between the root complex and the endpoint apparatus. The host processing apparatus is further configured to: access, via the memory mapped interface, a sub-system register associated with one of the plurality of sub-systems, without requiring the one sub-system to power into an operational state to service the access.

In one variant, each of the plurality of sub-systems includes a corresponding access space within the memory mapped interface, where each of the plurality of sub-systems may only access the corresponding access space within the memory mapped interface.

In another variant, the root complex further includes a plurality of control registers and the host processing apparatus is further configured to read or write to at least a portion of the plurality of control registers while the communication link is in a lower power state.

In yet another variant, the host processing apparatus is further configured to, when the communication link is in the lower power state: execute an instruction that accesses a memory location within a communication link function; wake the communication link from the lower power state; and access a memory space within the memory mapped interface, the memory space associated with the communication link.

In yet another variant, the host processing apparatus is further configured to wake the one sub-system subsequent to the access of the sub-system register.

In yet another variant, the one sub-system includes a cellular sub-system and the host processing apparatus is further configured to: query for cellular function within the endpoint apparatus without waking the cellular sub-system.

In a third embodiment, the computerized apparatus includes a host processing apparatus including a root complex; a peripheral apparatus including an endpoint apparatus, the endpoint apparatus including a plurality of functions, each of the plurality of functions being coupled with a respective sub-system of a plurality of sub-systems; and a communication link between the root complex and the endpoint apparatus. The host processing apparatus is configured to sequentially boot each of the plurality of sub-systems.

In one variant, the host processing apparatus is further configured to prune one of the plurality of sub-systems from a booting process.

In another variant, the prune of the one of the plurality of sub-systems from the booting process is configured to reduce power consumption for the computerized apparatus as compared with a boot of each of the plurality of sub-systems.

In yet another variant, the endpoint apparatus is configured to be powered regardless of operational status for any of the plurality of sub-systems.

In yet another variant, the host processing apparatus determines an order of importance for a boot sequence for the plurality of sub-systems and the computerized apparatus is further configured to sequentially boot each of the plurality of sub-systems in accordance with the determined order of importance.

In yet another variant, the host processing apparatus is further configured to issue a function level reset to a function of the plurality of functions.

In yet another variant, the issuance of the function level reset to the function of the plurality of functions is further configured to reset a corresponding sub-system associated with the function.

In a sixth aspect, a peripheral processing apparatus for use in an electronic device is disclosed. In one embodiment, the peripheral processing apparatus includes: an endpoint apparatus, the endpoint apparatus including a plurality of functions, each of the plurality of functions being coupled with a respective sub-system of a plurality of sub-systems for the peripheral processing apparatus. Each of the plurality of sub-systems includes an independent power management state machine over other ones of the plurality of sub-systems.

In one variant, a first independent power management state machine of a first one of the plurality of sub-systems is further configured to: send a sleep mode request while in an active state to a host processing apparatus; enter a sleep wait state subsequent to the sending of the sleep mode request; detect an update to a peripheral sleep control register, the update being initiated by the host processing apparatus; and enter a sleep state from the sleep wait state in response to the detected update to the peripheral sleep control register.

In another variant, the first independent power management state machine of the first one of the plurality of sub-systems is further configured to: check whether the host processing apparatus has any pending data transactions; if there are pending data transactions, initiate a wake-up process in order to transition the first independent power management state machine from the sleep state to the active state; enter an active wait state; and enter the active state from the active wait state upon detection of an update to the peripheral sleep control register by the host processing apparatus.

In yet another variant, a first independent power management state machine of a first one of the plurality of sub-systems is further configured to: receive a host enter sleep message from a host processing apparatus; suspend the first independent power management state machine of the first one of the plurality of sub-systems in response to the received host enter sleep message; and process all pending transfer descriptors subsequent to the suspension of the first independent power management state machine.

In yet another variant, other ones of the plurality of sub-systems are further configured to receive the host enter sleep message from the host processing apparatus.

In yet another variant, the first independent power management state machine is further configured to transition from an active state to a sleep state subsequent to the processing of all the pending transfer descriptors.

In yet another variant, the first independent power management state machine of the first one of the plurality of sub-systems is further configured to re-establish communication with the host processing apparatus through issuance of a wake-up request for the host processing apparatus.

In a seventh aspect, a host processing apparatus for use in an electronic device is disclosed. In one embodiment, the host processing apparatus further includes logic configured to establish a memory mapped interface to the endpoint apparatus; and logic configured to access, via the memory mapped interface, at least one of the plurality of sub-system registers, independent of the operational status of the corresponding at least one sub-system.

In one variant, the logic configured to access, via the memory mapped interface, the at least one of the plurality of sub-system registers, further includes logic configured to read a register associated with one of the plurality of sub-system registers.

In another variant, the logic configured to access, via the memory mapped interface, the at least one of the plurality of sub-system registers, further includes logic configured to write to a register associated with one of the plurality of sub-system registers.

In yet another variant, the logic configured to access further includes logic configured to: execute an instruction that accesses a memory location within a Peripheral Component Interconnect Express (PCIe) function; wake a PCIe communication link; and access a memory space within the memory mapped interface, the memory space associated with the PCIe communication link.

In yet another variant, the host processing apparatus further includes logic configured to wake the corresponding at least one sub-system subsequent to the access of the memory space.

In yet another variant, the corresponding at least one sub-system comprises a cellular sub-system and the host processing apparatus further includes logic configured to query for cellular function within the endpoint apparatus without waking the cellular sub-system.

In yet another variant, the host processing apparatus further includes logic configured to access, via the memory mapped interface, each of the plurality of sub-system registers, independent of operational status for the plurality of sub-systems.

In an eighth aspect, a non-transitory computer readable apparatus is also disclosed. In one embodiment, the non-transitory computer readable apparatus includes instructions which when executed by a processor apparatus, causes the apparatus to perform the various aforementioned methods is disclosed.

In one variant, the instructions are configured to, when executed by the processor, cause the apparatus to independently manage distinct power and/or clock domains. For instance, in one implementation, the instructions, when executed, cause the apparatus to selectively boot, reset, and/or trap errors for various disclosed sub-systems.

In a ninth aspect, computerized logic is disclosed. In one embodiment, the computerized logic is configured to perform the various aforementioned methods.

In one variant, the logic includes at least one of hardware (e.g., gate logic), firmware, and/or software resident on the apparatus.

In a tenth aspect, a memory mapped bus architecture for a multi-function apparatus is disclosed. In one embodiment, the memory mapped bus architecture is based on a PCIe technology, and the memory mapped bus architecture services a host processor, a cellular modem, a wireless local area network modem, and a personal area network modem.

Other features and advantages of the present disclosure will immediately be recognized by persons of ordinary skill in the art with reference to the attached drawings and detailed description of exemplary embodiments as given below.

BRIEF DESCRIPTION OF THE DRAWINGS

FIG. 4 is a logic diagram showing two exemplary power management state machines useful for power management of an exemplary sub-system domain, in accordance with the principles described herein.

FIG. 8 is a logical block diagram of one exemplary method for peripheral reset operation, consistent with the various principles described herein.

Figure 1:
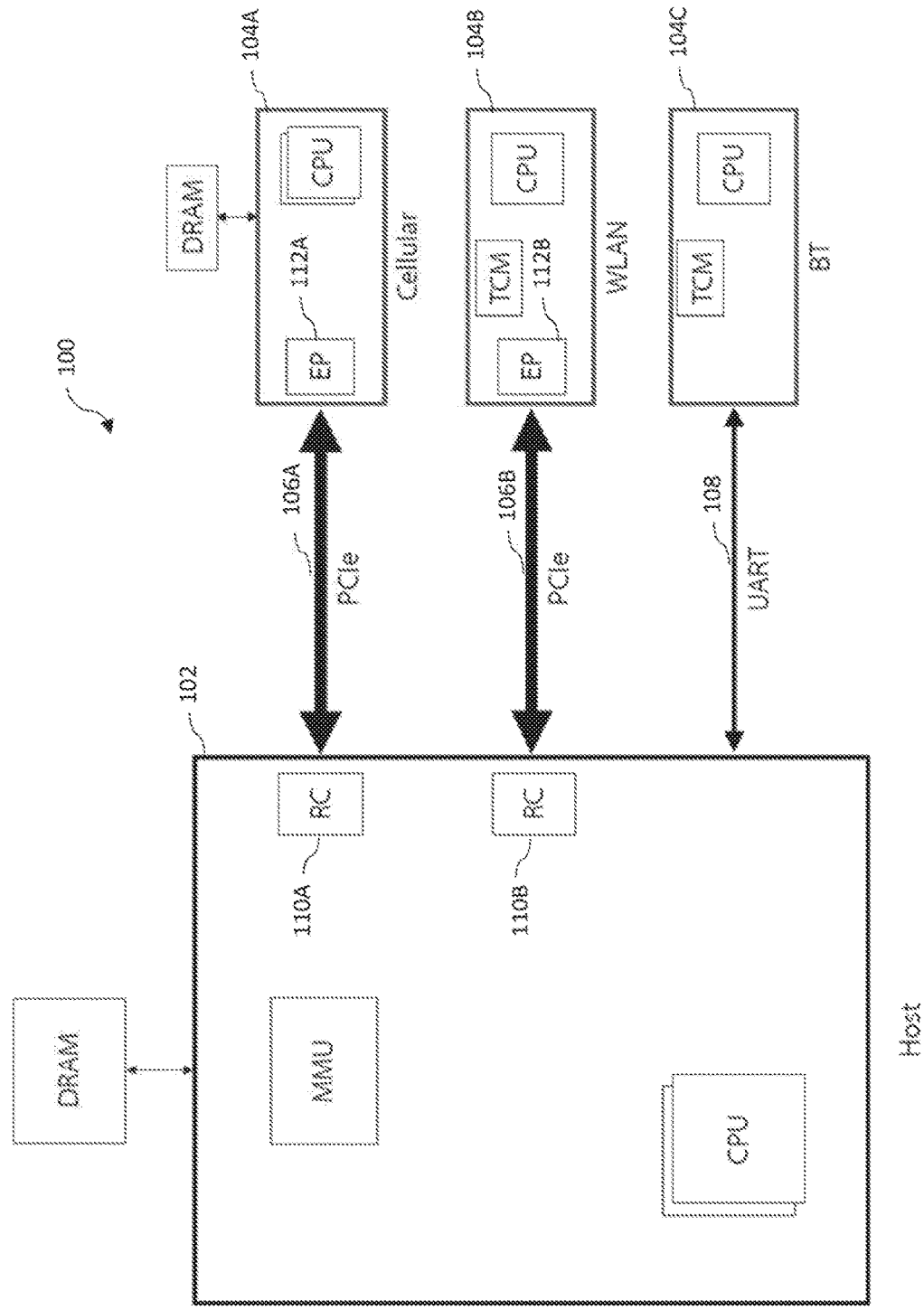
FIG. 1 is a logical block diagram of one prior art system for a memory mapped bus architecture.

All Figures © Copyright 2016-2017 Apple Inc. All rights reserved.

DETAILED DESCRIPTION

Reference is now made to the drawings, wherein like numerals refer to like parts throughout.

Detailed Description of Exemplary Embodiments

Exemplary embodiments of the present disclosure are now described in detail. While these embodiments are primarily discussed in the context of a bus architecture for high-speed mobile applications, it will be recognized by those of ordinary skill that the present disclosure is not so limited. In fact, the principles described herein are useful for any bus architecture, component, device, and/or network of devices that support multiple independent sub-systems.

Moreover, while the following embodiments describe specific implementations of e.g., dedicated address spaces, powering sequences, clocking implementations, boot sequences, sleep sequences, error trapping, and/or reset handling, those of ordinary skill in the related arts will readily appreciate that the following descriptions are purely illustrative of the broader principles described herein. Other implementations may have a greater or fewer number of functionalities, different combinations of functions, and/or functional differences consistent with the descriptions provided herein.

As used herein, the term "system" refers generally, and without limitation, to any independent logical and/or physical entity which may or may not include substituent logical and/or physical processing entities. Common examples of systems include e.g., smartphones, computers, laptops, tablets, "smart" televisions and other media distribution and rendering devices, vehicle infotainment or telematics systems, and/or other consumer electronic devices.

As used herein, the term "sub-system" refers generally, and without limitation, to any processing entity that operates under the direction of a system entity to perform a prescribed set of tasks. Common examples of sub-systems include e.g., cellular modems, wireless local area network (WLAN) modems, personal area network (PAN) modems, graphics processors, media processors, global positioning systems (GPS), and/or any other general or special purpose processing entity.

As used herein, the term "function" refers generally, and without limitation, to processing and/or memory resources associated with a memory mapped connection for a sub-system. An exemplary PCIe function may include e.g., sub-system specific registers, a memory mapped input/output (MMIO), a configuration space, internal bus structures, and/or other specialized registers or memories. In some cases, the configuration space may be genericized/standardized, proprietary or otherwise customized (e.g., vendor-specific, application-specific, device-specific, or configured according to other specific scheme), or a combination of the foregoing.

Overview—

Various aspects of the present disclosure are directed to isolation of sub-system resources (such as clocks, power, and reset) within independent domains present within electronic devices. For example, in one exemplary embodiment, each sub-system of a system has a dedicated clock domain. In particular, peripheral chipset hardware may be composed of multiple sub-systems that each operate in an independent clock domain.

Moreover, each sub-system may be powered based on an independent power domain. Each power domain may be independently powered on/off or placed into various power-conserving modes, and may have a distinct state machine for power management. Independent power domains may be powered regardless of the state machine of other power domains.

In another aspect, each sub-system can be connected to a common memory mapped bus function. In one exemplary embodiment, the common memory mapped bus function and the sub-systems operate within independent domains; thus, the functions and corresponding sub-systems can enter any power state regardless of the memory mapped bus's overall power state, the other sub-systems power state, and/or the host system power state.

In some variants described herein, the sub-systems or memory mapped bus may manage the sub-system resources based on operational considerations; for example, if a host application requires low latency responses, then the corresponding sub-system will prevent the memory mapped bus from entering into a low power mode. In another such example, battery consumption may limit the number of sub-systems that can be concurrently powered; thus, a prioritization scheme may be used to resolve conflicts and/or allocate resources.

Exemplary implementations of the present disclosure include a host that manages the overall power consumption of the system, thus the host processor may exert control over the various sub-systems, such as keeping a sub-system awake or force a sub-system to sleep. However, some variants disclosed herein provide such capability to the peripheral as well (or in the alternative, the peripheral may exclusively manage, for example, the overall power consumption of the system). For example, in some cases, the peripheral may also be configured to exert varying degrees of control over the host (or portions thereof), such as preventing the host from sleeping.

In one exemplary embodiment described herein, the sleep sequence for each sub-system is isolated from other sub-systems; however, other embodiments provide for partially- or fully-coordinated sub-system power management.

PCIe-Based Systems—

Consumer tastes have historically driven aggressive form factor constraints for mobile devices. Traditional designs relied on much smaller pin interfaces that were port-mapped (such as the Universal Serial Bus (USB)). These technologies are compact, but also may suffer from slower transfer rates, packet processing overhead, and/or excessive power consumption when in use.

As a brief aside, so-called "port-mapped access" host processors use a native set of instructions for accessing its own memories and registers, and a second set of instructions for communicating with external sub-systems via a "port". The transacted data is formatted (e.g., packetized, serialized) for transmission over an intermediary communication format. The intermediary communications format isolates sub-system memory from the host memory; i.e., each peripheral sub-system has a separate address space which is isolated from the host's address space. For example, a packet protocol (such as USB) adds transactional overhead (e.g., USB pipes, endpoint identification, etc.)

In contrast, so-called "memory-mapped access" uses the same address bus to address both host and peripheral sub-systems; in other words, the memory and registers of the peripheral sub-systems are directly accessed by the host, and vice versa. For example, when an address is accessed by the host, the same address format may be used to access either the host's memory or the peripheral's memory and/or registers. Each peripheral sub-system monitors the address bus, and responds to any host access of an address assigned to that sub-system.

PCIe is one implementation of a memory-mapped bus technology; unfortunately, PCIe requires a large bus interface (with nearly forty (40) pins), and has a disproportionately large "footprint" on the printed circuit board (PCB) "real estate", especially when compared to other bus technologies. Consequently, the size of PCIe has historically made it a poor match for mobile applications (the latter which characteristically have comparatively small form factors).

However, recent advances in wireless technology have increased the wireless bandwidth of the "data pipe" for wireless applications. In some cases, the wireless network speeds can outpace slower bus technologies (e.g., USB) of the host device. Similarly, customer tastes have adapted to larger mobile devices (in no small part due to the popularity of larger screen sizes). For these reasons, interest in PCIe has been revitalized for mobile applications. Incipient designs (such as those manufactured by the Assignee hereof) require faster communication between an application processor and peripheral chipsets based on memory mapped bus interfaces.

Referring now to FIG. 1, a typical prior art system 100 is shown and described in detail. The illustrated system depicts a host 102 which is in communication with: a cellular sub-system 104A via a PCIe link 106A; and a WLAN sub-system 104B via a PCIe link 106B. Additionally, the host controls a PAN sub-system 104C (e.g., a Bluetooth® sub-system) via a universal asynchronous receiver/transmitter (UART) link 108. Each of the PCIe links is managed by a respective PCIe root complex (RC) (110A, 110B), and a corresponding respective endpoint (EP) (112A, 112B).

During normal operation, the user of the device may place a phone call, access the Internet, or otherwise perform a user-initiated request for a data connection to, for example, the cellular network. Responsively, the cellular sub-system 104A enters a connected mode and sends/receives user voice and data; otherwise, the cellular sub-system 104A may spend the majority of its time powered down in an idle mode to save power. Additionally, the cellular sub-system 104A may frequently re-connect to the cellular network for mobility management, to check for incoming calls, and/or perform other autonomous network management tasks. These autonomous (non-user initiated) actions generally occur in the background, unnoticed to the user.

Similarly, the WLAN sub-system 104B continually scans its nearby networks to identify, for example, the best possible data connection, and/or transmit and receive user data; when not in use, the WLAN sub-system 104B may transition into a low-power mode.

PCIe streamlines memory mapped architectures for increased performance and/or to optimize operation between multiple processors; however, space considerations remain a priority. Thus, advantages may exist when multiple sub-systems are merged into a reduced number of chipsets (e.g., a single chipset (where possible)), and communicate over a single memory mapped bus interface, while preserving the independence of software stacks running on the application processor. Unfortunately, existing PCIe specifications do not specify endpoint design requirements. Consequently, different manufacturers have adopted many different PCIe sub-system implementations, many of which are inconsistent and/or undesirable. For instance, a single endpoint may put all of its sub-systems to sleep, and/or wake all sub-systems together. Improved solutions are needed that implement a consistent framework e.g., for "wake" and/or "sleep" functionality within systems that support multiple independent sub-systems.

To these ends, the present disclosure is directed to, inter alia, separating power management and clock functionality from the PCIe interface. Various solutions described herein may support multiple sub-systems (each with independent power and clock) using the same PCIe interface, thereby minimizing the design footprint. In other words, the described solutions can enable PCIe-like operation (and its attendant benefit of enhanced processing speed and efficiency) in aggressive form-factor designs by splitting a memory mapped bus functionality from power and clock management functionality according to a consistent framework. In some disclosed configurations, each PCIe endpoint may support multiple dedicated address spaces, powering sequences, clocking implementations, boot sequences, sleep sequences, error trapping mechanisms, and/or reset handlers.

More generally, methods and apparatus for independent operation of power, clock, and/or other resource domains within the context of a memory mapped architecture are provided.

Exemplary Apparatus—

As noted above, in order to address the deficiencies of prior art PCIe operation, exemplary embodiments of the present disclosure advantageously specify a consistent framework for using the PCIe technology to support different power and clock domains for sub-systems.

Figure 2:
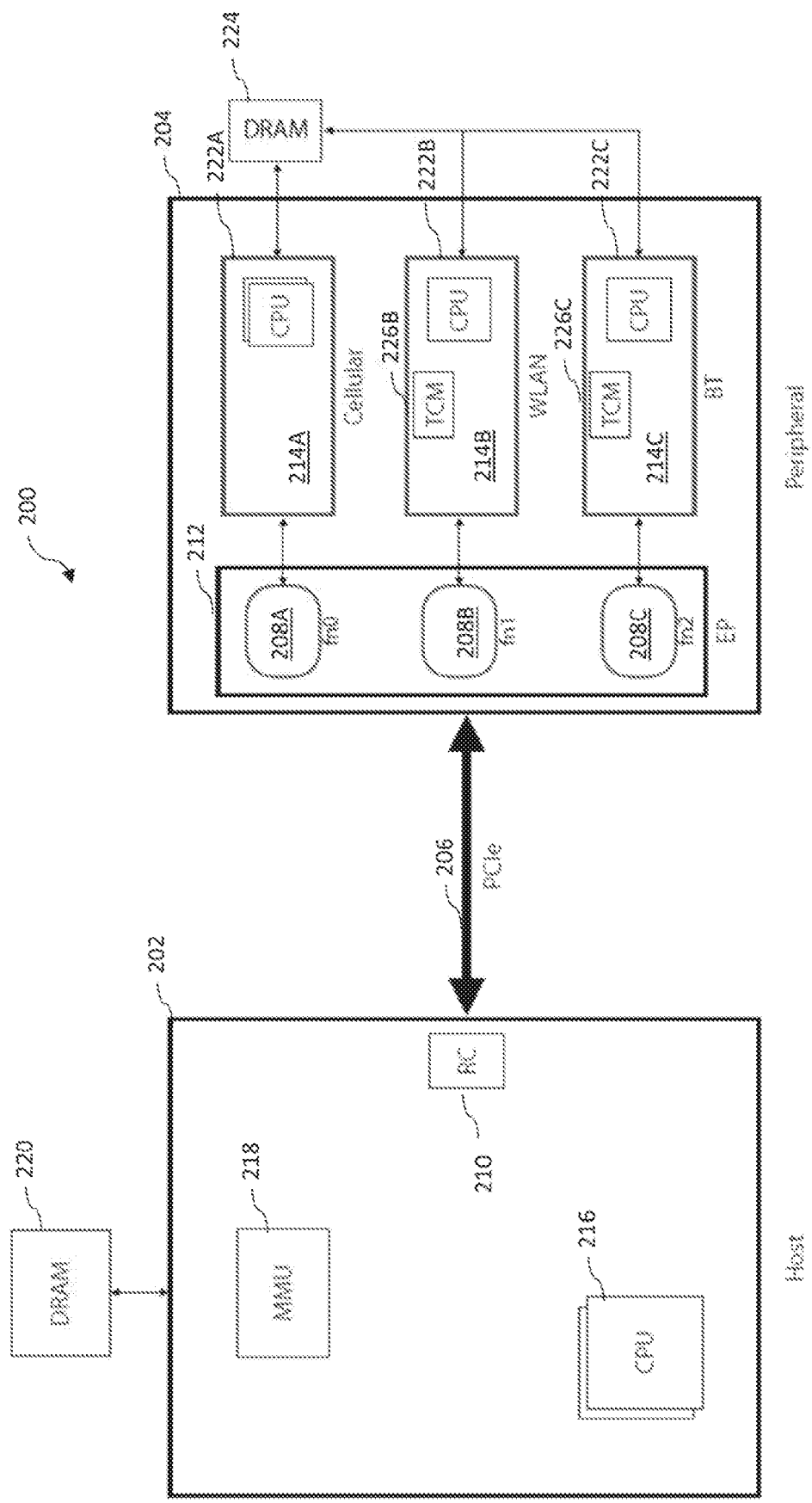
FIG. 2 is a logical block diagram of one exemplary system for a memory mapped bus architecture having independent power and clock domains, in accordance with the principles described herein.

Referring now to FIG. 2, one exemplary system 200 is shown and described in detail. The illustrated system 200 depicts a host 202 which is in communication with a peripheral 204 via a PCIe link 206. The PCIe link 206 connects a root complex (RC) 210 of the host 202 (e.g., a host processor apparatus) to an endpoint (EP) 212 of the peripheral 204 (e.g., a peripheral processor apparatus). While a single RC 210 is illustrated in FIG. 2, it would be readily apparent to one of ordinary skill given the contents of the present disclosure that multiple RCs may be utilized in some implementations. The EP 212 is further subdivided into a number of functions which couple to corresponding sub-systems. As shown, a cellular sub-system 214A is coupled via a first function 208A; a WLAN sub-system 214B is coupled via a second function 208B; a PAN sub-system 214C is coupled via a third function 208C. While a specific topology is illustrated in FIG. 2, it would be appreciated by those of ordinary skill in the art, given the contents of the present disclosure, that more (or even less) sub-systems may be present within system 200.

It is noted that while the present disclosure is illustrated with reference to a host and a peripheral, for reasons which will become apparent below, the designation as to host or peripheral is used to simplify and/or clarify the following explanations, and does not imply existing host or peripheral functionality, or that such roles cannot be reversed (e.g., a traditional "host" can function as a peripheral in at least some capacities, and vice versa). Moreover, the principles described herein can be extended to support additional processing chipsets (e.g., additional hosts and/or additional peripherals) other than those explicitly described.

The host 202 of the system 200 of FIG. 2 includes a central processing unit (CPU) 216 as well as a memory management unit (MMU) 218 in the illustrated embodiment, and is connected to external memory (such as dynamic random access memory (DRAM) 220 and/or flash or disk storage systems.) The illustrated sub-systems may include, without limitation: a cellular modem 214A and a corresponding CPU 222A; a WLAN modem 214B and a corresponding CPU 222B; and a PAN modem 214C and a corresponding CPU 222C. In addition, the sub-systems may each access one or more external memories 224 and/or internal tightly coupled memories (TCM) 226.

The exemplary system 200 has isolated power and clock domains for the host processor 216, the PCIe link 206 (including the RC 210 and EP 212), and/or each of the sub-systems (214A, 214B, 214C). As used in the present context, the term "domain" refers to logic within a sub-system that is independently self-sufficient and does not require other sub-systems for its own operation. Common examples of domains include, without limitation e.g., power domains, clock domains, reset domains, security domains, processing domains. While each domain is self-sufficient, artisans of ordinary skill in the related arts will readily appreciate given the contents of the present disclosure, that during normal operation multiple domains may be concurrently used and/or interact with one another; in fact some use cases may require that multiple domains are concurrently enabled.

During normal operation, each of the aforesaid domains may operate independently of one or more of the other domains. For example, during a mobility management update, the cellular sub-system 214A may connect to a cellular network without, for example, powering on the host 202, the PCIe link 206, the RC 210, the EP 212, or the other sub-systems (214B, 214C). Similarly, the WLAN sub-system 214B may scan for nearby beacons without waking up any of the other domains.

Figure 3:
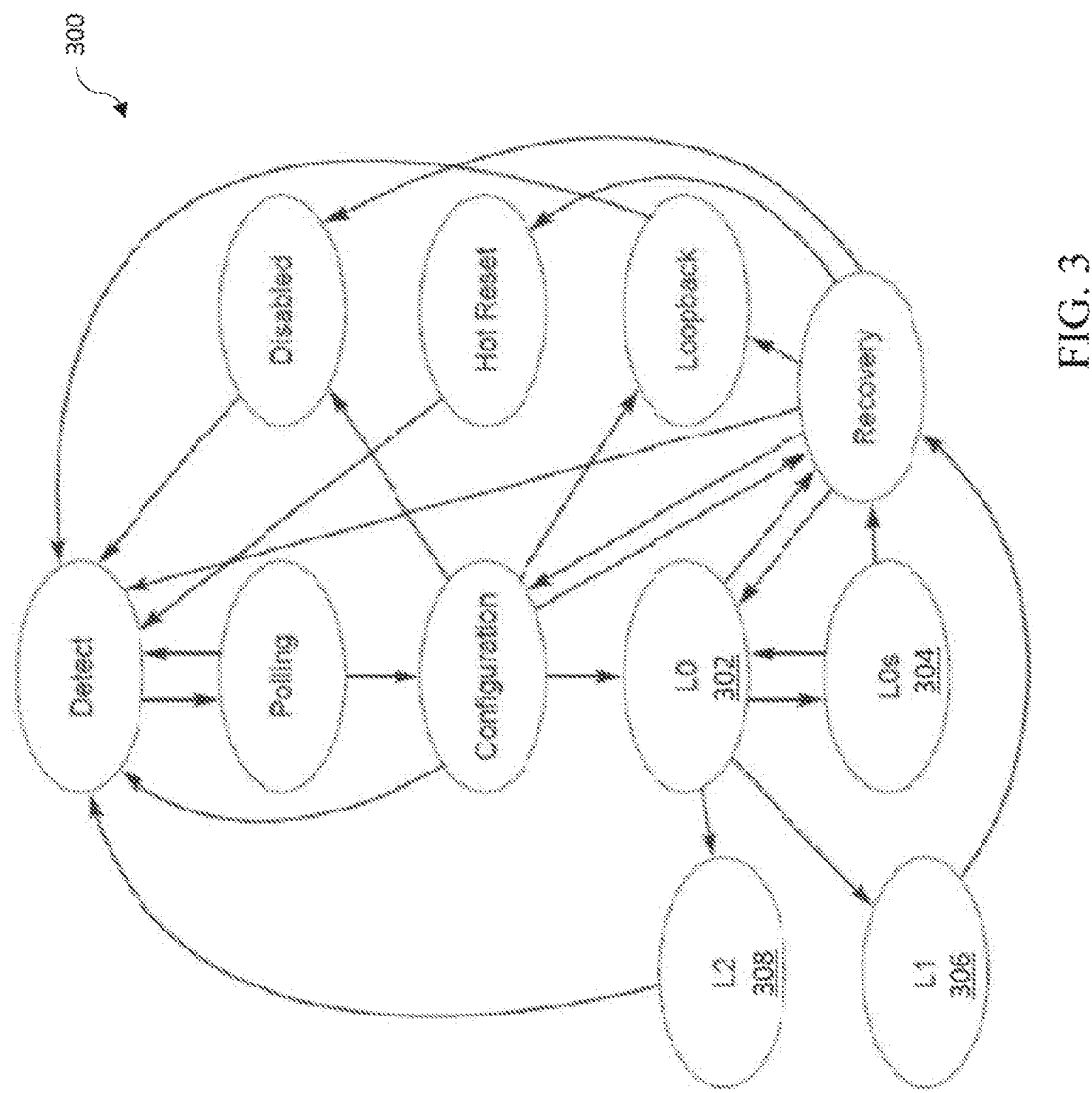
FIG. 3 is a logic diagram of one exemplary Link Training and Status State Machine (LTSSM) useful for power management of an exemplary PCIe memory mapped bus, in accordance with the principles described herein.

As a brief aside, PCIe link power management is based on a Link Training and Status State Machine (LTSSM). One such LTSSM 300 is illustrated within FIG. 3; as shown, the state machine 300 includes, inter alia, states L0 302, L0s 304, L1 306, and L2 308.

L0 302 is the operational state of the physical bus interface where data and control packets can be transmitted and received.

L0s 304 is a first power saving state that allows the physical bus interface to quickly enter and recover from a power conservation state without going through the Recovery state.

L1 306 is a second power saving state that allows additional power savings over L0s 304 at the cost of additional resume latency (due to the Recovery state). In one exemplary embodiment, L1 306 may be further sub-divided into e.g., sub-states L1.1 and L1.2. In one implementation thereof, L1.1 allows common-mode voltages of the port circuitry to be maintained, while powering off transmit and receive circuitry and associated phase locked loops (PLLs). L1.2 powers off the common-mode voltages in addition to the transmit and receive circuitry and PLLs.

Finally, L2 308 is a third power saving state that aggressively conserves power by turning off most functionality.

Figure 4A:
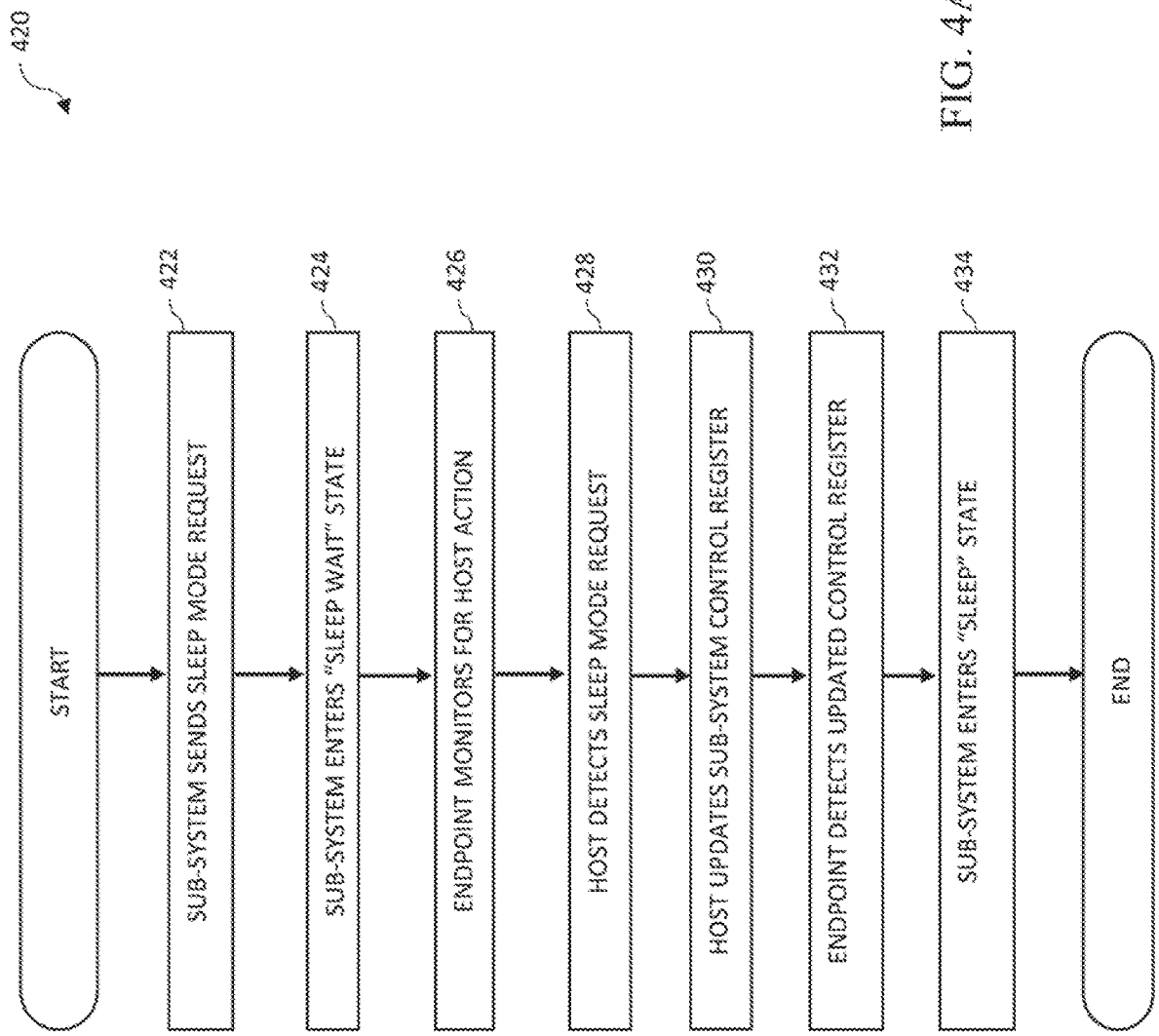
FIG. 4A is a logical block diagram of one exemplary method for entering a sleep state for an exemplary sub-system, in accordance with the principles described herein.
Figure 4B:
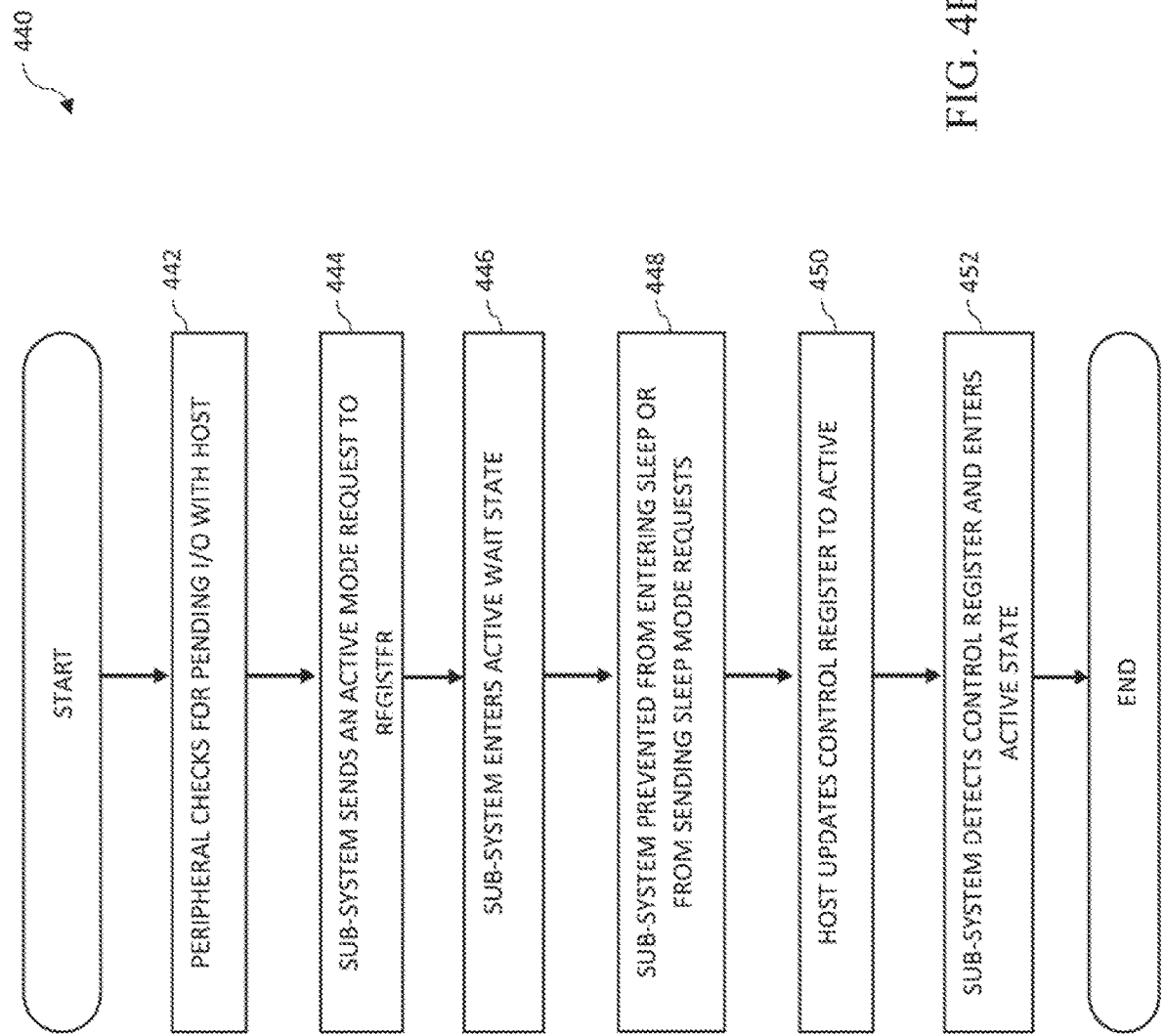
FIG. 4B is a logical block diagram of one exemplary method for entering an active state for an exemplary sub-system, in accordance with the principles described herein.

PCIe does not mandate a particular power management state machine for connected sub-systems; however FIG. 4 is representative of one such implementation. As shown, the state machine of FIG. 4 illustrates a pair of independent state machines within a host processor and a peripheral processor that manage power jointly. The following discussion is presented with regard to the pair of state machines; however it is appreciated that a system with a single host and multiple sub-systems may have one instance of the host state machine and one instance of the sub-system state machine for each sub-system. Each sub-system's state machine interacts in isolation with the corresponding host state machine. The following discussion describes interactions between a single host state machine and a single sub-system state machine, although it would be appreciated that the following principles would apply to implementations in which multiple independent sub-system state machines exist, see e.g., FIG. 2 (or multiple host state machines), with the following discussion merely being illustrative of the broader principles for the sake of simplicity.

Moreover, artisans of ordinary skill in the related arts given the present disclosure may apply the principles described herein to suit e.g., a sub-system-to-sub-system power sequence, or a sub-system-to-host power sequence.

During normal operation, the peripheral processor (e.g., a function 208A, 208B, 208C for a given respective subsystem 214A, 214B, 214C) may send a sleep mode request in the Active state 402 via a memory mapped address (e.g., a Peripheral Sleep Notification register) or other messaging mechanism (e.g., GPIO, out-of-band signaling, doorbells, etc.). See also operation 422 in FIG. 4A. For example, the peripheral processor may include multiple sub-systems and may send the sleep mode request for one of the multiple sub-systems. Thereafter, the peripheral processor (e.g., a function 208A, 208B, 208C for a given respective subsystem 214A, 214B, 214C) enters a Sleep_Wait state 404 (e.g., for one of the multiple sub-systems). See also operation 424 in FIG. 4A. When in the Sleep_Wait state 404, the peripheral processor (e.g., a function 208A, 208B, 208C for a given respective sub-system 214A, 214B, 214C) is quiescent and does not initiate or complete any data transfers or messages. The peripheral processor (e.g., a function 208A, 208B, 208C for a given respective sub-system 214A, 214B, 214C) monitors a memory mapped address (e.g., a Peripheral Sleep Control register) for host action. See also operation 426 in FIG. 4A. In some embodiments, wake-up procedures can be initiated by using an out-of-band GPIO (which triggers wake); wake-up procedures can be triggered via a dedicated in-band MMIO doorbell.

When the host detects the sleep mode request (e.g., while in Active mode 412), the host processor may update the Peripheral Sleep Control register to "Sleep Mode" for, for example, one of the multiple sub-systems. See also operations 428 and 430 in FIG. 4A. The host processor may also enter the Sleep state 416. The peripheral processor (e.g., a function 208A, 208B, 208C for a given respective sub-system 214A, 214B, 214C) detects the update in the Peripheral Sleep Control register for, for example, one of the multiple sub-systems and enters the Sleep state 406. See also operations 432 and 434 in FIG. 4A.

While one or more of the sub-systems is in the Sleep state 406, the peripheral processor checks whether the host processor has any pending transfers or messages in flight for one or more sub-systems. See also operation 442 in FIG. 4B. If so, then the peripheral processor initiates the "wake-up" process to transition to the Active state 402. Similarly, if the peripheral processor needs to access the communication link, then it will wake-up.

In order to wake-up, the peripheral processor sends an Active Mode request via e.g., the Peripheral Sleep Notification register and enters the Active_Wait state 408. See also operations 444 and 446 of FIG. 4B. The peripheral processor can thereafter immediately access the communications link for data transfer and messages, however (in order to prevent a state machine race condition) the peripheral processor cannot enter sleep or send a Sleep Mode request. See also operation 448 of FIG. 4B.

Responsive to the Active Mode request, the host updates e.g., the Peripheral Sleep Control register to "Active Mode" and enters the Active state 412. See also operation 450 of FIG. 4B. The peripheral processor enters the Active state 402 when it sees the host's update in the Peripheral Sleep Control register. See also operation 452 of FIG. 4B.

The host initiated sleep process is similar (i.e., the power management state machine of the host may be considered symmetric with the peripheral sub-system power management state machine). When the host is ready to enter sleep, it informs the peripheral processor via a Host Enter Sleep Message (and transitions to Sleep_wait state 414). Upon seeing the Host Enter Sleep Message, the peripheral processor suspends its own sleep state machine, and processes all pending transfer descriptors (TDs). As is discussed in greater detail hereinafter, the host may need to inform multiple sub-systems before it can transition to Sleep state 416.

Responsive to the Sleep Message completion, the host may transition to sleep mode (from the Sleep_wait state 414); thereafter, the peripheral processor may also independently enter sleep mode. If the peripheral processor needs to reestablish communication with host, it can request the host to wake-up via e.g., an out-of-band general purpose input output (GPIO) that triggers a wake sequence. The host transitions to an Active_wait state 418 in order to re-initialize operation, etc. Once the host successfully exited the Active_wait state 418 and has woken (in Active state 412), the host updates the peripheral with a Host Exit Sleep Message.

Referring back to the peripheral processor, once the peripheral processor transfer descriptor ring (TDR) processing is complete, the peripheral processor transmits a complete/acknowledge response to the Sleep Message. Thereafter the peripheral processor will not accept any more TDRs until it receives a Host Exit Sleep Message from the host processor (received via a Message Ring (MR)). The peripheral will acknowledge/complete the Host Exit Sleep Message before resuming data transfers.

The foregoing description is purely illustrative of one exemplary state machine. Other variants are described in commonly owned and co-pending U.S. patent application Ser. No. 14/879,027 entitled "Methods and Apparatus for Managing Power with an Inter-Processor Communication Link Between Independently Operable Processors", filed Oct. 8, 2015, previously incorporated herein by reference in its entirety.

As previously noted, each sub-system of the illustrated embodiment has its own independent instance of its corresponding sub-system power management state machine. Referring back to FIG. 2, the cellular sub-system 214A has a first instance of a power management state machine; the WLAN sub-system 214B has a second instance of a power management state machine; and the PAN sub-system 214C has a third instance of a power management state machine. It will be appreciated that the foregoing sub-system power management state machines are purely illustrative; other state machines may be substituted by an artisan (or used in combination with the foregoing) so as to accommodate various other design considerations. For example, different applications and different components may have different power management state machines depending on their functionality, relative power consumption, or yet other factors.

In one exemplary embodiment, the domains may operate concurrently with the other domains without restriction (e.g., one or more domains may be powered at the same time). In other embodiments, the independent operation of the domains may be subject to overriding power consumption, heat dissipation, and/or interference constraints. For example, certain aggressively designed products may not be able to sufficiently power all domains simultaneously, or may not be able to meet overall battery life constraints when all domains are powered. Still other products may be so aggressively sized that heat dissipation and/or undesirable electromagnetic noise floor increases (due to differences in clocks) may be an issue. Consequently, intelligent power management variants contemplated herein may preferentially enable or disable domains so as to accommodate such device limitations (e.g., based on a prioritized weighting of the domains, one or more user preferences, historical usage, and/or other selection information).

In one exemplary embodiment, the disclosed PCIe interface is also independently operable without restriction; e.g., the PCIe interface has its own power and clock domain that is distinct from both the host processor 216 and the peripheral sub-systems 214A, 214B, 214C. As with the other sub-systems, the PCIe sub-system in this embodiment can enter and/or exit power save modes independent of other sub-systems. Such systems can enable "housekeeping" type operations e.g., status updates, setting/resetting timers, and/or other autonomous accesses without requiring the host, peripheral, or sub-system operation.

During operation, each of the power management state machines of the exemplary embodiment operates independently. For example, the cellular sub-system 214A may communicate with a cellular network mobility management entity (MME), while the other sub-systems remain in sleep states. When the cellular sub-system needs to update the host processor, it fires an interrupt to the host processor 216 that wakes the PCIe link. Responsively, the PCIe LTSSM transitions into its L0 state 302 to bridge communications to the host processor 216 (which also must responsively transition to its active state, if not already active). Once the transaction has concluded, the cellular sub-system can revert back to its respective sleep state.

Additionally, since the PCIe sub-system stores function information for each of the sub-systems, PCIe register accesses by the host should be completed by the EP 212 or the functions (208A, 208B, 208C) without requiring the sub-systems (214A, 214B, 214C) to power-up and/or initiate so-called "backplane accesses." So-called backplane accesses refer generally to accesses that require an internal access mechanism such as e.g., a peripheral internal interconnect, bus, and/or shared and/or unshared resource. More directly, the host can access PCIe control space and MMIO registers for each of the sub-systems without requiring the sub-system to power into an operational state to service the memory access. For example, the host can read/write to various ones of the functions without waking the corresponding sub-system; e.g., the RC 210 can query the EP 212 for cellular function 208A without waking the cellular sub-system 214A. Similarly, the PCIe link can transition to a lower power mode (e.g., such as L0s, L1.1, and/or L1.2) without powering down the sub-systems.

The exemplary multi-function EP 212 may additionally be required to intelligently manage access to and/or from the connected sub-systems 214A, 214B, 214C. For example, in one exemplary embodiment, each sub-system is separately addressable within its own operational domains (e.g., power and clock domains). In other words, each memory mapped input output (MMIO) region exposed via a PCIe base address register (BAR) directly corresponds, and is used exclusively for a single sub-system. Each BAR (that corresponds to a sub-system) references or "points" to a unique set of backing memory addresses. Additionally, each sub-system may be "sandboxed" such that it may only access a designated space or region; e.g., only MMIO and configuration space within its own MMIO region. In some variants, this may be enforced with hardware protection (e.g., logical address decoders, multiplexers) and/or software protection (e.g., address traps, windowing).

In some embodiments, the PCIe domain is further sub-divided for the RC 210, PCIe physical link 206, and the EP 212. Such a sub-division enables the PCIe link 206 to be powered down without also powering down the RC 210 and/or the EP 212. For example, some variants may allow the EP 212 to continue to update control register spaces for each function (208A, 208B, 208C) corresponding to the sub-systems (214A, 214B, 214C) while the link 206 is in deep sleep. In other words, the PCIe configuration registers and MMIO registers residing in the PCIe EP 212 do not require any backplane access or sub-systems to be clocked or powered on. Similarly, the host processor 216 may read/write to the RC 210 control registers without enabling the link 206 or the EP 212. Such functionality is particularly useful where, under some conditions, the entire peripheral 204 is dropped into an unpowered mode (e.g., powering down VDD and global clocks) for significant power savings but the host processor requires access to the RC 210 control registers. Upon activation of the communication link 206, the host (and peripheral) will be able to monitor, and respond to, updates to the respective registers.

Under certain circumstances the host (via the RC) can wake a sub-system by writing to the corresponding MMIO region within the EP. For example, if the host accesses a particular MMIO region and/or associated configuration registers corresponding to a sleeping sub-system, then the EP will "wake-up" the sub-system and trigger an interrupt to it. Similarly, each sub-system can read and write the contents of its own sandboxed registers in the corresponding MMIO and configuration regions regardless of the PCIe link state e.g., without requiring a reference clock and/or disturbing the PCIe link power state (e.g., does not require exiting from L0 302, L0s 304, L1 306, and L2 308).

Example Operation—

In addition to physical differences to the prior art PCIe hardware bus implementations, exemplary embodiments of the present disclosure specify an operational framework for PCIe bus protocols to suit independent sub-system domain operation.

Exemplary Modifications to Root Complex and Endpoint Operation—

Some disclosed embodiments described herein have decoupled their power and clock domains as between the RC, PCIe link, EP and any attached sub-systems. In addition to separating operation into different domains for individual operation, each of the entities in such cases may additionally have access to various shared data structures without disturbing the other entities' current power state. For example, the RC can access portions of the function registers and memory within the EP without unnecessarily waking any of the sub-systems; similarly, each sub-system may access RC registers without waking the host processor. Additionally, each sub-system may also access its corresponding endpoint, function, and/or MMIO registers without waking the PCIe link. While it is appreciated that the various improvements described herein allow independent access, artisans of ordinary skill will readily appreciate that existing techniques may be preserved; for example, accesses that wake the associated sub-system may also be allowed e.g., to support legacy functionality and/or existing use cases.

Figure 5:
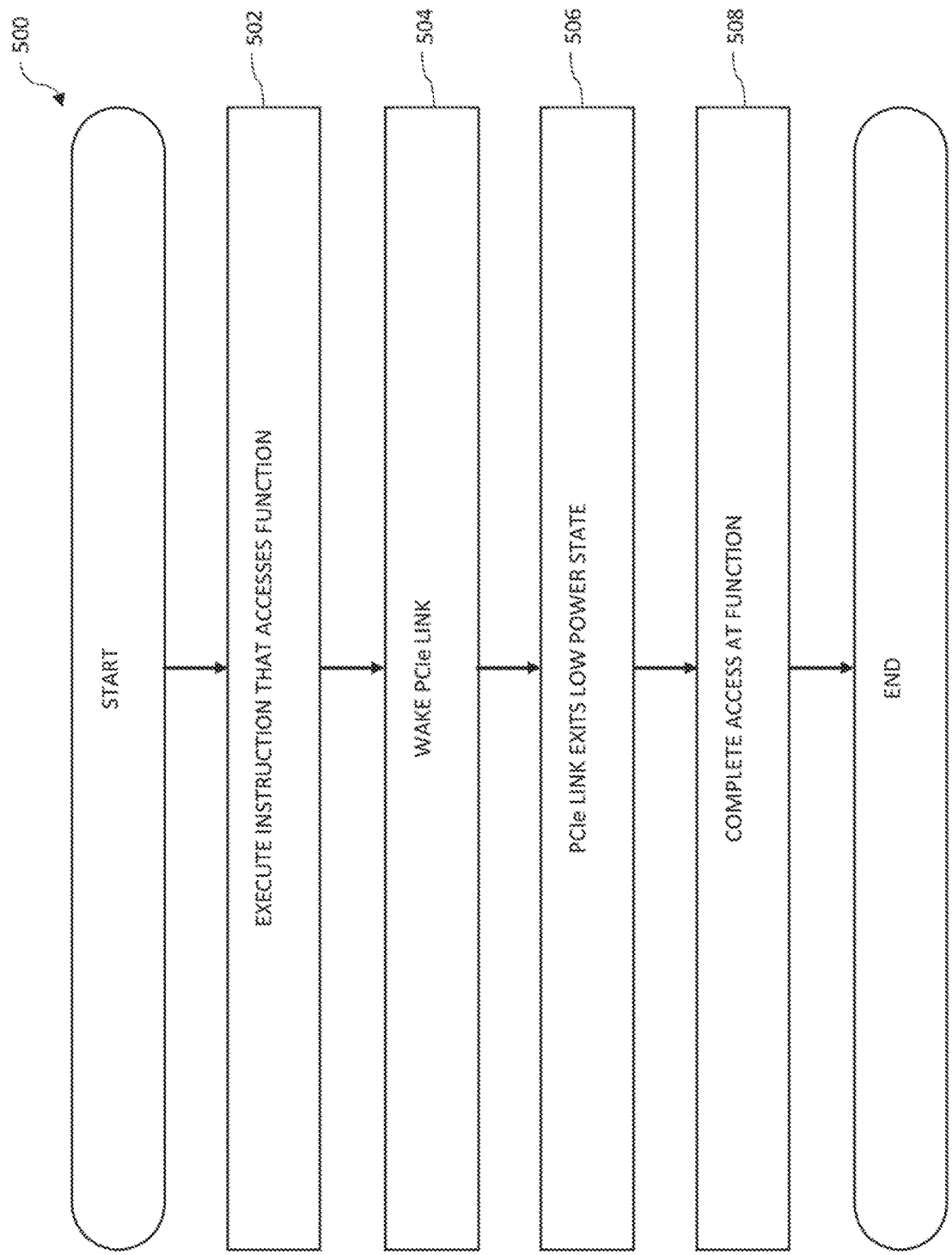
FIG. 5 is a logical block diagram of one exemplary method for accessing registers within a sub-system, consistent with the various principles described herein.

FIG. 5 illustrates one exemplary method for accessing registers within a sub-system according to the disclosure.

At step 502 of the method 500, the host processor executes an instruction that accesses a memory location within a PCIe function (e.g., functions 208A, 208B, 208C within FIG. 2). As previously noted, memory mapped accesses are natively translated to a memory location (i.e., without requiring overhead necessary for an intermediary port-mapped communication format). Common examples of accesses include without limitation: reads, burst reads, writes, burst writes, posted writes, and/or sets/clears. Memory locations may include any in-band addressable memory location, which may include without limitation: registers, memories, and/or other data structures.

At step 504 of the method 500, the host processor access maps to the RC which, in some implementations, triggers the PCIe link to wake to L0 state 302. In some implementations, the PCIe link may already exist in L0 state 302. In existing prior art PCIe operation, the root complex (RC) and endpoint (EP) coordinate link operation via three (3) signals: PERST# (PCIe Reset), WAKE# (wake functionality is described in greater detail hereinafter), and CLKREQ# (clock request). PERST# is driven by the RC and signifies (when de-asserted) that power is stable and the link may be enabled; CLKREQ# is sometimes driven by an EP and signifies (when asserted) a request for a link clock and/or a request to exit L1 sub-states. CLKREQ# is also sometimes driven by the RC and signifies (when asserted) a request to exit the L1 state or sub-states (e.g., L1.1, L1.2). Once the host indicates that the link is available (by de-asserting PERST#), the EP can wake the host and RC by asserting CLKREQ#; thereafter, transactions can commence.

At step 506 of the method 500, the PCIe EP responsively exits its low power state, if not already active. Internally, the memory mapped accesses are routed via a memory controller, bus arbiter, or other access control mechanism to the appropriate memory location within the EP. As noted earlier, sub-system accesses correspond to functions that have been assigned specific and exclusive memory regions within the EP. For example, the memory access may correspond to e.g., an access of a register within a function.

At step 508 of the method 500, the access to the PCIe EP memory space is completed at the function (including an acknowledgement where required). Once completed, the PCIe link and/or RC may proceed with the next transaction (i.e., the current transaction does not stall the PCIe link). In some variants, the EP may additionally wake-up the sub-system as a separate process from the register access described in FIG. 5. For example, the PCIe EP may wake the corresponding sub-system to e.g., propagate the register access or perform another task based on the register access.

In one such variant, the signaling protocol for CLKREQ# wakes the PCIe link from its low power state, and does not wake other sub-system domains from low power states. As discussed in greater detail hereinafter, Initial bus transactions provide a boot image for booting the EP; once the EP has successfully booted, the host and RC can de-assert PERST# to indicate link stability, thereby enabling the EP to commence link training. Since the sub-systems are running on separate domains, PERST# can be reset repeatedly without impacting the state of any sub-systems inside the peripheral. Boot images for the sub-systems are delivered once the link has completed initialization.

Additionally, since PERST# is decoupled from sub-system and/or host operation, the PERST# can wake the PCIe block from any power save state without consideration for the host and other sub-systems. More directly, the PERST# logic can be greatly simplified as it does not impact functionality outside of the PCIe link. In some exemplary variants, the PERST# and/or CLKREQ# logic can be implemented entirely within hardware and/or simplified logic so as to reduce software transactional overhead and improve robustness.

Other modifications and/or additions to PCIe signaling may be made by those of ordinary skill, consistent with the principles described herein, and suitable for a wide variety of different multi-functional bus operations. For example, more sophisticated implementations may add or remove signaling logic (e.g., based on general purpose input outputs (GPIOs)). Still other implementations may dedicate individual PERST# and/or CLKREQ# lines for each supported sub-system of the EP (e.g., creating a bundled array of PERST# and CLKREQ#).

Exemplary Sub-System Power Control—

Once the sub-systems have properly initialized, the sub-systems implement individualized power states for their respective domains. In order to support fully independent power and clock domain operation within the peripheral, the exemplary sub-systems and EP are modified to include configuration registers to control domain operation including e.g., powering the sub-system on, off, or any number of other intermediate low power modes (and/or gradients thereof).

As previously noted, sleep modes are generally characterized by powering down progressively more and more sub-system components. For example, light sleep may merely power down high refresh rate memories; moderate sleep may store short term volatile memory to a non-volatile storage and power down the volatile memories. Deep sleep may additionally power down phase lock loops (PLLs), digital locked loops (DLLs), and/or other clocking hardware. Waking up is performed by powering on the powered off components in reverse sequence (e.g., clocks before non-volatile memories, non-volatile memory before volatile memory). Thus, progressively deeper low power modes may result in longer waking latencies. Still other power sequencing techniques will readily be appreciated by those of ordinary skill in the related arts, given the contents of the present disclosure.

In one such implementation, each sub-system's configuration registers are initialized to a default state when the peripheral is initially powered on, whereas the register's contents are "sticky" (or non-volatile) during reset (e.g., across peripheral resets and/or function level resets). In alternative variants, the configuration registers may not be initialized on power up, but may be initialized during a reset sequence. Still other implementations may incorporate a hybrid of reset sequences (e.g., a peripheral reset initializes the configuration registers but a function level reset does not).

While the foregoing disclosure is primarily directed to configuration registers for power and clock domain operation, it is readily appreciated by those of ordinary skill in the related arts given the contents of the present disclosure, that the configuration registers may be used to convey or configure interrupts, trapped errors, operational modes, versioning information, file structure information, and/or virtually any other operational parameters.

PCIe Link Power Control—

In some cases, the exemplary host and RC are separate from the peripheral (such as is illustrated in FIG. 2). The internal host domain power control may be substantially similar to peripheral domain operation described above; in fact, the host may even have multiple sub-systems. However, since the host controls when the PCIe link is enabled and/or disabled, additional link sequencing is required to ensure that the host does not attempt to signal the peripheral when the peripheral is unavailable, and vice versa (e.g., the peripheral does not attempt to signal the host when the host is unavailable).

In one exemplary embodiment, before the host transitions into a non-responsive low power mode (e.g., where the host processor will be unavailable to respond to instructions such as by residing in a sleep state), the host will perform a protocol handshake for each sub-system. Each sub-system may then gracefully prepare to transition to their corresponding low power state (such the device power states described supra) in accordance with their internal considerations (e.g., storing current execution and memory to non-volatile or sticky memory). Thereafter, the sub-system may enter a low power mode. Once the host has completed protocol handshakes for all of the sub-systems, the host can then assert PERST# that indicates that the link is no longer available. As previously noted, exemplary sub-systems of the present disclosure do not need to wake up during subsequent PERST# transitions. Alternative implementations may allow the sub-system to "opt-in" for receiving PCIe interrupts. For example, a sub-system may wait until PERST# is asserted before going to low power states; such functionality may be useful for debugging or otherwise monitoring PCIe transactions.

Once the host has successfully transitioned to a low power mode, any of the sub-systems can wake the host via the PCIe interface by asserting a WAKE# signal to the host. In one such implementation, the WAKE# signal is shared between all sub-systems, and the host driver can determine the originating sub-system via the power management event (PME). Other implementations may provide a configuration register or MMIO register that indicates the sub-system that triggered the WAKE# event. In another implementation, each sub-system has a dedicated WAKE# GPIO (general purpose input output (GPIO)), and the host driver can determine the originating sub-system via the asserted WAKE# GPIO.

Responsive to receiving WAKE# signaling, the host exits its sleep state and de-asserts PERST# to indicate that it has successfully woken up. The host enables the PCIe link (via the aforementioned LTSSM), and enumerates the appropriate PCIe functions. Once the host has successfully enumerated the link, the active sub-system(s) may transact data with the host. Successful link re-establishment concludes with a handshake between the host and the sub-system.

Figure 6:
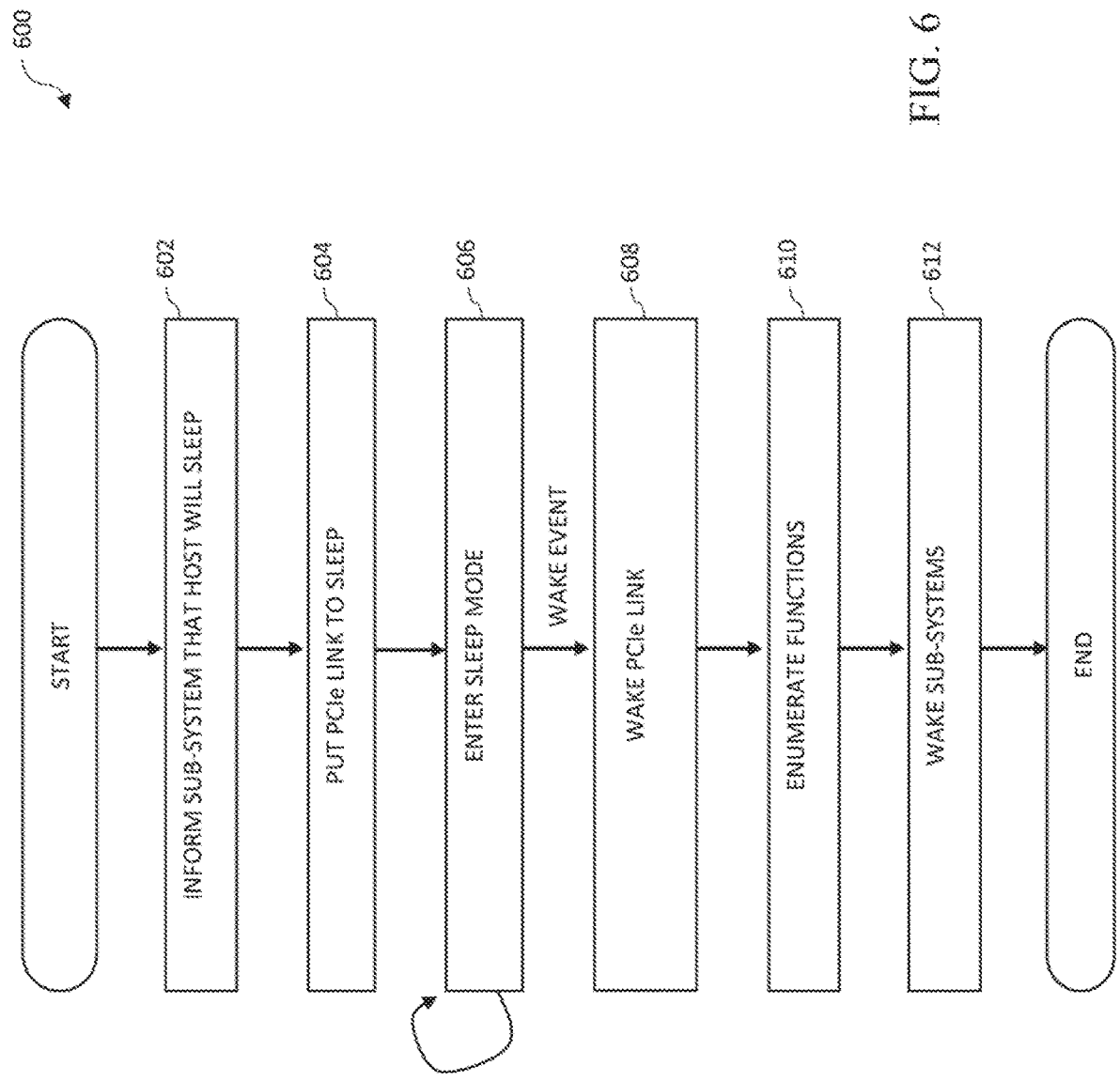
FIG. 6 is a logical block diagram of one exemplary method for transitioning the host processor into a sleep mode, consistent with the various principles described herein.

Referring now to FIG. 6, one exemplary method for transitioning the host processor into a sleep mode is disclosed.

At step 602 of the method 600, the host processor notifies each of the sub-systems that the host is entering a deep sleep mode. Each sub-system may then independently assess whether it should also sleep. For example, a sub-system may transition to a sleep mode to conserve power since the host will not be accessing any of the sub-systems while it is sleeping. In other cases however, the sub-system may need to communicate with other external network entities even while the host is asleep; in such cases, the sub-system may remain in an operational mode. In some variants, only the host has the unilateral power to prevent a sub-system from sleeping. In alternative variants, the sub-systems may also have the power to prevent the host from sleeping (e.g., where power management is bilateral, or bilateral subject to certain limitations). Generally, it is appreciated that the sleep sequence for each sub-system is isolated from other sub-systems; however, artisans of ordinary skill in the related arts may substitute inter-related sub-system power management with equal success, given the contents of the present disclosure.

At step 604 of the method 600, the host processor may put the PCIe link to sleep. At this time, the PCIe link transitions to L2 state 308, and the RC asserts PERST# to indicate that the link is inactive. Typically, the EP will also be asleep; however it is readily appreciated that the EP may be kept awake or independently awoken by sub-systems that remain operational while the host is asleep. More directly, even though the PCIe sub-system is being held in reset, each of the individual sub-systems may remain awake or wake up autonomously to e.g., perform various network management tasks. For example, the cellular sub-system can wake up to check for paging messages and/or update network mobility management entities. Similarly, the WLAN sub-system may periodically check for available hot-spot access and/or nearby open networks.

At step 606, the host enters its sleep mode. In some cases, the host may store volatile memory to non-volatile memory, reduce power to cores and/or other related components (e.g., clocks, power supply, memories, and/or attached components). In some cases, the host may continue to e.g., monitor when a wake condition occurs or perform lower priority tasks in a reduced power mode (e.g., with slower clocks, reduced memories or cores). For example, the processor may only power enough of the core to track a wake timer and/or check the RC for a wait condition. In other situations, the host is completely quiescent, relying on other logic to trigger a wake; for example, the PCIe link RC may be on a separate domain, and capable of triggering a host wake.

Subsequently thereafter, the host may exit sleep mode (step 608) due to e.g., timer expiration, interrupt service, peripheral sub-system access (via WAKE#), user action, and/or any number of other host services. The host wakes the PCIe link (if not already active) according to the PCIe LTSSM (see discussions of FIG. 3, supra).

At step 610, the host enumerates at least one function of the multi-function peripheral. In some cases, the host may enumerate all of the functions. In other cases, the host may enumerate only the active functions. In still other cases, the host may only enumerate the function(s) that triggered the wake condition.

In some cases, the host optionally transitions the enumerated sub-systems corresponding to the functions to an operational state at step 612.

Exemplary Boot Sequence—

Existing PCIe implementations have a simple boot sequence where the host initially boots its attached peripherals. Various embodiments of the present disclosure will boot the peripheral EP, and then individually boot each of the sub-systems. In one exemplary embodiment, once the host has successfully booted the peripheral EP, the host discovers and sequentially boots the sub-systems (e.g., first the cellular sub-system, then the WLAN sub-system, and finally the PAN sub-system.) In some cases, certain sub-systems may be pruned from the boot process where they are not needed for, for example, the application software. For example, if the user has disabled PAN capability, then the PAN sub-system is pruned from the boot sequence.

In more complex embodiments, the granularity of the individual domain control allows a host to power and/or boot sub-systems of the peripheral intelligently based on run-time considerations so as to e.g., reduce power consumption and/or reduce overall boot time. For example, a mobile device that does not currently require network access for user applications may boot only the host processor and the cellular sub-system while keeping the WLAN sub-system powered down. In this manner, the cellular sub-system can perform its mobility management sequences (e.g., registration, authentication, etc.) in the background with minimal interruption to the user, and overall boot time is reduced since the WLAN sub-system is not booted until it is needed for use.

In one exemplary implementation of a boot sequence, when the peripheral is initially powered, only the PCIe EP is powered. The other sub-systems may remain powered off until explicitly powered on. During the initial boot sequence, the EP may enumerate each one of the PCIe sub-systems and PCIe functions. For example, during the initial boot sequence, the EP may initialize each sub-system's PCIe BAR and corresponding configuration space and MMIO region. As previously noted, in some variants, the sub-system's BAR, configuration registers and MMIO can be accessed by the host, regardless of the power state of the corresponding sub-system.

PCIe enumeration may then selectively proceed for the various sub-systems. During PCIe enumeration of a given sub-system's configuration space, the host writes to the configuration registers to enable power to the sub-system. After successful initialization of the sub-systems, the host may set the bus master enable (BME) bit to enable the corresponding function to access host memory over the PCIe bus. Once the host has control of the PCIe link, the host may initiate the boot process for the specific sub-system which may include loading and/or execution of a boot image. Each sub-system may be individually booted, and boot processes of each sub-system may be independent from, and do not block or impact, the boot process of any other sub-system.

APPENDIX A provides tables describing exemplary behavior of a sub-system in response to sleep, power, and reset events initiated by the host. As described therein, the boot stage of the peripheral during a specified event results in the designated behavior.

Still other schemes for boot sequencing multi-function peripherals will be readily appreciated by those of ordinary skill in the related arts, given the contents of the present disclosure.

Exemplary Reset Sequence—

Each domain is individually resettable in an exemplary embodiment. The multi-reset scheme may re-initialize configuration parameters in some variants, whereas in other variants, reset may not re-initialize configuration parameters. Still other hybrid systems may have both resettable and sticky configuration parameters. In still other cases, resets may be coupled based on e.g., a hierarchical tier (i.e., a higher tiered reset may reset its lower tiers), functional grouping, configurable grouping, and/or other grouping methodology.

In one exemplary embodiment, each PCIe function block (located within the endpoint, not the sub-system) corresponding to an individual domain may also be individually resettable. In one such case, a function level reset will reset the coupled sub-system, not just the function block. Alternatively the function level reset will not reset the coupled sub-system. In still other implementations, the function block itself is also automatically reset when its corresponding sub-system is reset.

In one embodiment, resetting a function block may force the sub-system into its initial boot stage. In some variants, the sub-system may reset within a predetermined amount of time. In some cases, reset is "hard" (i.e., reset is forced regardless of current execution status and/or power state); in other cases, reset is "soft" (i.e., reset is performed according to a specific sequence that may, for example, allow current execution context to be recovered).

When the function level reset is triggered, the function block may automatically reset the contents of the sub-system's configuration space and MMIO. In some cases, certain bits or data structures are "sticky" and their contents may persist after reset. Common examples of such sticky data structures may include, without limitation, configuration registers used to control power to the sub-system. Other schemes may use non-sticky data structures, or a mix of sticky and non-sticky bits.

As previously noted, the host may initiate a reset of each function and/or sub-system without impacting the operational state of any other function and/or sub-system during operation. In addition, various embodiments of the present disclosure additionally support a peripheral-wide reset that resets the entire peripheral chipset. For example, once the host triggers a peripheral reset, any sub-system that is powered on at the time of a peripheral reset is reset, and any sub-system that is powered off at the time of a peripheral reset remains powered off. After the peripheral reset, the host may enumerate the PCIe functions and boot the sub-systems as described supra (see Exemplary Boot Sequence).

Figure 7:
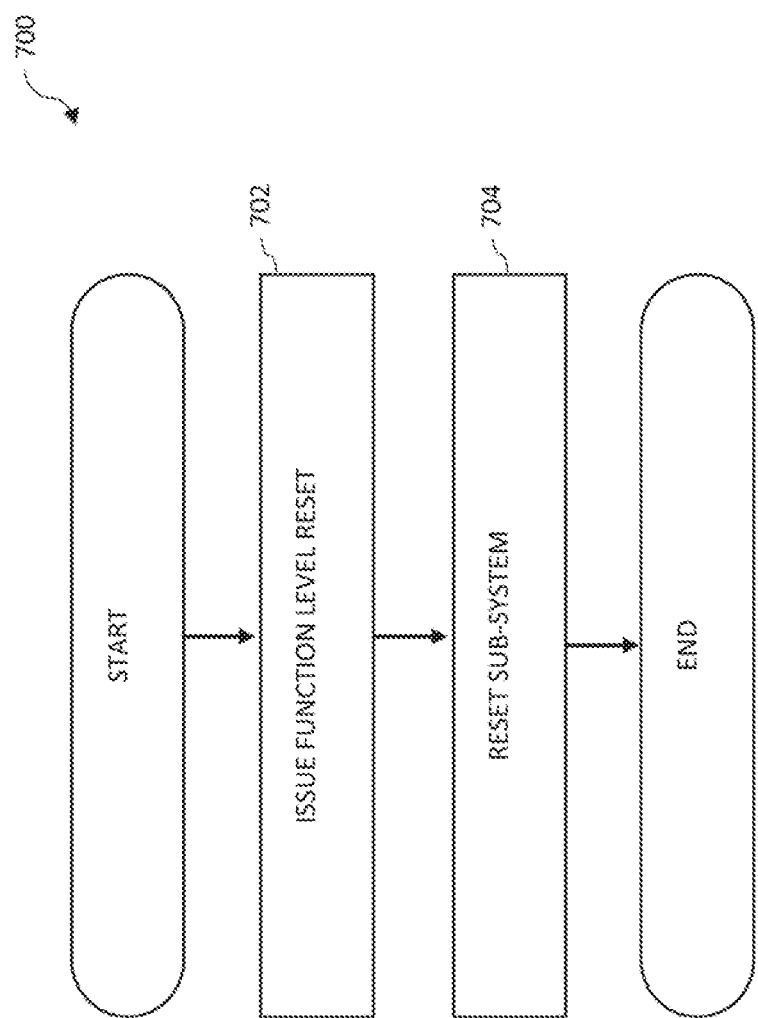
FIG. 7 is a logical block diagram of one exemplary method for function level reset operation, consistent with the various principles described herein.

FIG. 7 depicts one exemplary method for function level reset (FLR) operation. In one exemplary embodiment, each FLR is an in-band reset (e.g., residing in a dedicated register, MMIO address, or other addressable memory location). More generally, the FLR functionality may be issued by the host and may be managed by the specific function located within the EP.

At step 702 of the method 700, the host issues a function level reset to a sub-system of the peripheral.

Responsively, the sub-system of the peripheral is reset (step 704). In the exemplary embodiment, the function level resets may be handled regardless of power state of the function and/or sub-system. Artisans of ordinary skill in the related arts, given the contents of the present disclosure, will readily appreciate that other embodiments may consider current power state during reset (e.g., so as to gracefully store volatile memory contents, and/or exit processes).

In some cases, the sub-system may be powered down in addition to, or in lieu of, the reset sequence of FIG. 7. For example, the host processor may issue a function level power-off instruction, and responsively the corresponding sub-system may power down.

In one such implementation, the peripheral reset drives all of the function level resets to achieve peripheral reset. Thus, function level sticky bits are preserved even during peripheral reset. In other implementations, the peripheral reset may be a dedicated reset mechanism that is distinct from the function level resets. A dedicated peripheral reset mechanism may be useful, for example, where sticky bits for a function level reset should be cleared. For example, FIG. 8 depicts one exemplary method for peripheral level reset operation. In one exemplary embodiment, the peripheral reset is a hardware reset; for example, the peripheral level reset may be implemented with a general purpose input/output (GPIO) or other dedicated hardware signaling.

As a brief aside, existing peripheral reset schemes do not preserve sub-system state post-reset. For example, one such prior art reset scheme may turn off the PCIe link, reset the peripheral, turn back on the PCIe link, and re-initialize each of the connected sub-systems. In contrast, various embodiments of the present disclosure retain the sub-system state; e.g., sub-systems that were asleep or off before reset remain asleep or off, and sub-systems that were active before reset remain active.

At step 802 of the method 800, the peripheral PCIe link may be powered down and/or PERST# may be asserted.

As shown in FIG. 8, the host may issue a peripheral level reset to the peripheral at step 804 of the method 800. The entire peripheral is reset, including the peripheral EP, functions and corresponding sub-systems.

After reset, each of the sub-systems may execute the contents of their read only memory (ROM) and initialize accordingly (step 806). In some embodiments, the ROM contents may be limited to e.g., idle spin loops. In ROM-less environments, the sub-system's processor may execute out of a volatile memory which may not have valid instructions; under such conditions, the processor doesn't start running until triggered to do so by the host.

Thereafter, the host may power the PCIe port and the PCIe link may transition to an operational link state of its LTSSM (e.g., L0 state).

At step 808, the host enumerates all of the functions of the peripheral, and may transition each sub-system to an operational state. As previously noted, the host retains the sub-system state; in other words, the sub-systems that were asleep or off before reset remain asleep or off, and sub-systems that were active before reset remain active. Thereafter, boot procedures may proceed in accordance with the aforementioned processes.

Still other schemes for resetting multi-function peripherals will be readily appreciated by those of ordinary skill in the related arts, given the contents of the present disclosure.

Artisans of ordinary skill in the related arts will readily appreciate that many software debugging techniques rely on successful error trapping. In some embodiments, once an unexpected software error is detected, the processor aborts further operation and executes a looping instruction (a "spin"); in this manner the host may retrieve the memory contents for debugging. In another embodiment, once an unexpected software error is detected, the sub-system may be rebooted. The contents of the memory are accessible as they are preserved across reset conditions. In still other embodiments, a separate hardware watchdog timer can be used for each sub-system. As a brief aside, a hardware watchdog is periodically reset by software so long as the software is correctly running; if the watchdog timer expires, then it forces a reset under the presumption that the software has been corrupted by e.g., an errant software access or other bus malfunction. Each hardware watchdog resets only the corresponding sub-system and does not affect other sub-systems.

APPENDIX B provides tables describing exemplary behavior of a sub-system when performing error trapping and/or the preferred handling mechanisms.

Other examples of common debugging instructions that may be used once a sub-system is reset includes register snapshots (e.g., a sub-system may be forced to collect a snapshot of all sub-system registers), and core dumps (e.g., where a sub-system may be forced into an abort handler in order to collect a snapshot of sub-system memory).

It will be recognized that while certain embodiments of the present disclosure are described in terms of a specific sequence of steps of a method, these descriptions are only illustrative of the broader methods described herein, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure and claimed herein.

While the above detailed description has shown, described, and pointed out novel features as applied to various embodiments, it will be understood that various omissions, substitutions, and changes in the form and details of the device or process illustrated may be made by those skilled in the art without departing from principles described herein. The foregoing description is of the best mode presently contemplated. This description is in no way meant to be limiting, but rather should be taken as illustrative of the general principles described herein. The scope of the disclosure should be determined with reference to the claims.

What is claimed is:

1. A method for providing access to a plurality of sub-system registers corresponding to a plurality of sub-systems, the plurality of sub-system registers being within an endpoint apparatus of a peripheral processor apparatus, the endpoint apparatus being associated with the plurality of sub-systems, the method comprising:

establishing a single memory mapped interface to the plurality of sub-system registers of the endpoint apparatus of the peripheral processor apparatus, the peripheral processor apparatus being configured to perform data communication with a host processor apparatus; and accessing, by the host processor apparatus via the memory mapped interface, at least one of the plurality of sub-system registers independently of other ones of the plurality of sub-system registers, without waking the corresponding at least one sub-system of the plurality of sub-systems within the endpoint apparatus of the peripheral processor apparatus.

2. The method of claim 1, wherein the accessing, via the memory mapped interface, the at least one of the plurality of sub-system registers, further comprises reading a register associated with one of the plurality of sub-system registers.

3. The method of claim 1, wherein the accessing, via the memory mapped interface, the at least one of the plurality of sub-system registers, further comprises writing to a register associated with one of the plurality of sub-system registers.

4. The method of claim 1, wherein the accessing further comprises:

executing an instruction that accesses a memory location within a Peripheral Component Interconnect Express (PCIe) function;

waking a PCIe communication link; and accessing a memory space within the memory mapped interface, the memory space associated with the PCIe communication link.

5. The method of claim 4, further comprising waking the corresponding at least one sub-system subsequent to the accessing of the memory space.

6. The method of claim 1, wherein the corresponding at least one sub-system comprises a cellular sub-system and the method further comprises:

querying for cellular function within the endpoint apparatus without waking the cellular sub-system.

7. The method of claim 1, further comprising accessing, via the memory mapped interface, each of the plurality of sub-system registers, without waking the plurality of sub-systems.

8. A computerized apparatus, comprising:

a host processing apparatus comprising a root complex;

a peripheral apparatus comprising an endpoint apparatus, the endpoint apparatus comprising a plurality of functions disposed within a memory mapped interface, each of the plurality of functions being coupled with a respective sub-system of a plurality of sub-systems; and a communication link between the root complex and a plurality of sub-system registers of the endpoint apparatus;

wherein the host processing apparatus is further configured to:

access, via the memory mapped interface, a sub-system register of the plurality of sub-system registers, the sub-system register being associated with one of the plurality of sub-systems and accessed independently of other ones of the plurality of sub-system registers via the memory mapped interface by the host processing apparatus, without requiring the one sub-system associated with the sub-system register to power into an operational state to service the access.

9. The computerized apparatus of claim 8, wherein each of the plurality of sub-systems comprises a corresponding access space within the memory mapped interface, where each of the plurality of sub-systems may only access the corresponding access space within the memory mapped interface.

10. The computerized apparatus of claim 8, wherein the root complex further comprises a plurality of control registers; and wherein the host processing apparatus is further configured to read or write to at least a portion of the plurality of control registers while the communication link is in a lower power state.

11. The computerized apparatus of claim 10, wherein the host processing apparatus is further configured to, when the communication link is in the lower power state:

execute an instruction that accesses a memory location within a communication link function;

wake the communication link from the lower power state; and access a memory space within the memory mapped interface, the memory space associated with the communication link.

12. The computerized apparatus of claim 11, wherein the host processing apparatus is further configured to wake the one sub-system subsequent to the access of the sub-system register.

13. The computerized apparatus of claim 8, wherein the one sub-system comprises a cellular sub-system and the host processing apparatus is further configured to:

query for cellular function within the endpoint apparatus without waking the cellular sub-system.

14. A host processor apparatus for use in an electronic device, the electronic device further comprising a peripheral processor apparatus, the peripheral processor apparatus comprising an endpoint apparatus having a plurality of sub-system registers associated with a corresponding plurality of sub-systems disposed within the endpoint apparatus, the host processor apparatus being configured to:

establish a single memory mapped interface to the plurality of sub-system registers of the endpoint apparatus; and access, via the memory mapped interface, at least one sub-system register of the plurality of sub-system registers independently of other ones of the plurality of sub-system registers, the access of the at least one sub-system register being independent of an operational status of the corresponding at least one sub-system of the plurality of sub-systems disposed within the endpoint apparatus.

15. The host processor apparatus of claim 14, wherein the access, via the memory mapped interface, of the at least one sub-system register of the plurality of sub-system registers, comprises a read of a register associated with one of the plurality of sub-system registers.

16. The host processor apparatus of claim 14, wherein the access, via the memory mapped interface, of the at least one sub-system register of the plurality of sub-system registers, comprises a write to a register associated with one of the plurality of sub-system registers.

17. The host processor apparatus of claim 14, wherein the access comprises:

execution of an instruction that accesses a memory location within a Peripheral Component Interconnect Express (PCIe) function;

wake of a PCIe communication link; and access of a memory space within the memory mapped interface, the memory space associated with the PCIe communication link.

18. The host processor apparatus of claim 17, wherein the host processing apparatus is further configured to wake the corresponding at least one sub-system subsequent to the access of the memory space.

19. The host processor apparatus of claim 14, wherein the corresponding at least one sub-system comprises a cellular sub-system, and the host processor apparatus is further configured to query for cellular function within the endpoint apparatus without waking the cellular sub-system.

20. The host processor apparatus of claim 14, wherein the host processor apparatus is further configured to access, via the memory mapped interface, each of the plurality of sub-system registers, independent of an operational status for the plurality of sub-systems.

* * * * *